US010904069B2

(12) United States Patent
Ando et al.

(10) Patent No.: US 10,904,069 B2
(45) Date of Patent: Jan. 26, 2021

(54) COMMUNICATION APPARATUS EXECUTING SPECIFIC PROCESS RELATED TO SECURITY

(71) Applicant: BROTHER KOGYO KABUSHIKI KAISHA, Aichi (JP)

(72) Inventors: Satoko Ando, Chita (JP); Takeshi Miyake, Nagoya (JP)

(73) Assignee: BROTHER KOGYO KABUSHIKI KAISHA, Aichi (JP)

(*) Notice: Subject to any disclaimer, the term of this patent is extended or adjusted under 35 U.S.C. 154(b) by 35 days.

(21) Appl. No.: 15/815,898

(22) Filed: Nov. 17, 2017

(65) Prior Publication Data
US 2018/0152336 A1    May 31, 2018

(30) Foreign Application Priority Data

Nov. 29, 2016  (JP) ................................. 2016-231555
Nov. 29, 2016  (JP) ................................. 2016-231641

(51) Int. Cl.
*H04L 12/24*      (2006.01)
*H04L 29/06*      (2006.01)
*H04L 29/08*      (2006.01)

(52) U.S. Cl.
CPC .......... *H04L 41/0246* (2013.01); *H04L 29/06* (2013.01); *H04L 63/00* (2013.01);
(Continued)

(58) Field of Classification Search
CPC ..... H04L 41/0246; H04L 29/06; H04L 63/00; H04L 63/0236; H04L 63/08; H04L 63/12; H04L 63/10; H04L 63/20; H04L 67/02
(Continued)

(56) References Cited

U.S. PATENT DOCUMENTS 8,850,529 B2 *  9/2014  Urakawa ............. G06F 16/4393
                                                    726/4
8,922,820 B2 * 12/2014  Asai ..................... G06F 3/1286
                                                    358/1.15
(Continued)

FOREIGN PATENT DOCUMENTS

EP            2779617 A3     9/2014
JP         2004-179690 A     6/2004
(Continued)

OTHER PUBLICATIONS

Extended European Search Report dated Jan. 16, 2018 from EP 17202607.2.
(Continued)

*Primary Examiner* — Nicholas R Taylor
*Assistant Examiner* — Chong G Kim
(74) *Attorney, Agent, or Firm* — Scully Scott Murphy and Presser

(57) ABSTRACT

A communication apparatus includes a processor and a memory. The memory stores computer-readable instructions therein. The computer-readable instructions, when executed by the processor, causes the communication apparatus to perform: transmitting to a first external apparatus, which is connected to the communication apparatus via Internet, a request to request data transmission while the communication apparatus functions as a client and the first external apparatus functions as a server; after transmitting the request, receiving specific data as a response to the request from a second external apparatus which is connected to the communication apparatus via the Internet while the second external apparatus functions as a client and the communication apparatus functions as a server; and executing a specific process related to security after receiving the specific data.

19 Claims, 16 Drawing Sheets

(52) U.S. Cl.
CPC .......... *H04L 63/0236* (2013.01); *H04L 63/08* (2013.01); *H04L 63/12* (2013.01); *H04L 63/10* (2013.01); *H04L 63/20* (2013.01); *H04L 67/02* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 2006/0026600 A1* | 2/2006 | Yoshida | ............ | H04N 1/00204 719/310 |
| 2008/0005116 A1* | 1/2008 | Uno | ...................... | G06F 3/0622 |
| 2010/0235883 A1* | 9/2010 | Sato | ................... | H04N 1/00408 726/3 |
| 2011/0173324 A1* | 7/2011 | Wang | ..................... | H04L 67/02 709/225 |
| 2012/0081743 A1* | 4/2012 | Watanabe | ............. | G06F 16/958 358/1.15 |
| 2012/0117629 A1* | 5/2012 | Miyazawa | .............. | H04L 63/08 726/4 |
| 2012/0198521 A1* | 8/2012 | Urakawa | ............. | G06F 16/4393 726/4 |
| 2012/0233702 A1* | 9/2012 | Matsuda | ............... | G06F 21/608 726/26 |
| 2012/0239821 A1* | 9/2012 | Hozumi | ............. | H04L 67/1008 709/238 |
| 2013/0070780 A1* | 3/2013 | Hozumi | ............. | H04B 7/15542 370/437 |
| 2013/0194595 A1* | 8/2013 | Murata | .............. | G06K 15/4065 358/1.9 |
| 2013/0201509 A1* | 8/2013 | Miyazawa | ......... | H04N 1/00962 358/1.13 |
| 2014/0096202 A1* | 4/2014 | Matsuda | ............... | H04W 12/08 726/4 |
| 2014/0268236 A1* | 9/2014 | Ohara | ................... | G06F 3/1224 358/1.15 |
| 2014/0282481 A1* | 9/2014 | Ohara | ...................... | G06F 8/65 717/172 |
| 2014/0359707 A1* | 12/2014 | Smithson | ................ | H04L 63/08 726/4 |
| 2015/0277821 A1* | 10/2015 | Mori | ..................... | G06F 3/1236 358/1.15 |
| 2016/0337393 A1* | 11/2016 | Tsuchitoi | ............ | H04L 63/1433 |

FOREIGN PATENT DOCUMENTS

| | | |
|---|---|---|
| JP | 2006-279431 A | 10/2006 |
| JP | 2010-219757 A | 9/2010 |
| JP | 2014-235735 A | 12/2014 |
| JP | 2016-212832 A | 12/2016 |
| WO | 2015056833 A1 | 4/2015 |

OTHER PUBLICATIONS

Notice of Reasons for Refusal dated Oct. 6, 2020 received in Japanese Patent Application No. JP 2016-231641 together with an English language translation.

* cited by examiner

FIRST AND SECOND EMBODIMENTS

FIG. 3(A)
FIRST EMBODIMENT
HTTP REQUEST A

- SOURCE IP ADDRESS = LIP_M
- DESTINATION IP ADDRESS = GIP_S
- DESIGNATED URL
- UNIQUE ID
- REQUEST TRANSMISSION COMMAND

FIG. 3(B)
FIRST EMBODIMENT
HTTP REQUEST B

- SOURCE IP ADDRESS = GIP_R
- DESTINATION IP ADDRESS = GIP_S
- DESIGNATED URL
- UNIQUE ID
- REQUEST TRANSMISSION COMMAND

FIG. 3(C)
FIRST EMBODIMENT
HTTP RESPONSE A

- SOURCE IP ADDRESS = GIP_S
- DESTINATION IP ADDRES = GIP_R

FIG. 3(D)
FIRST EMBODIMENT
HTTP RESPONSE B

- SOURCE IP ADDRESS = GIP_S
- DESTINATION IP ADDRES = LIP_M

FIG. 3(E)
FIRST EMBODIMENT
HTTP REQUEST C

- SOURCE IP ADDRESS = GIP_S
- DESTINATION IP ADDRESS = GIP_R
- DESIGNATED URL
- UNIQUE ID

FIG. 3(F)
FIRST EMBODIMENT
ERROR RESPONSE

- SOURCE IP ADDRESS = GIP_R
- DESTINATION IP ADDRES = GIP_S
- ERROR INFORMATION

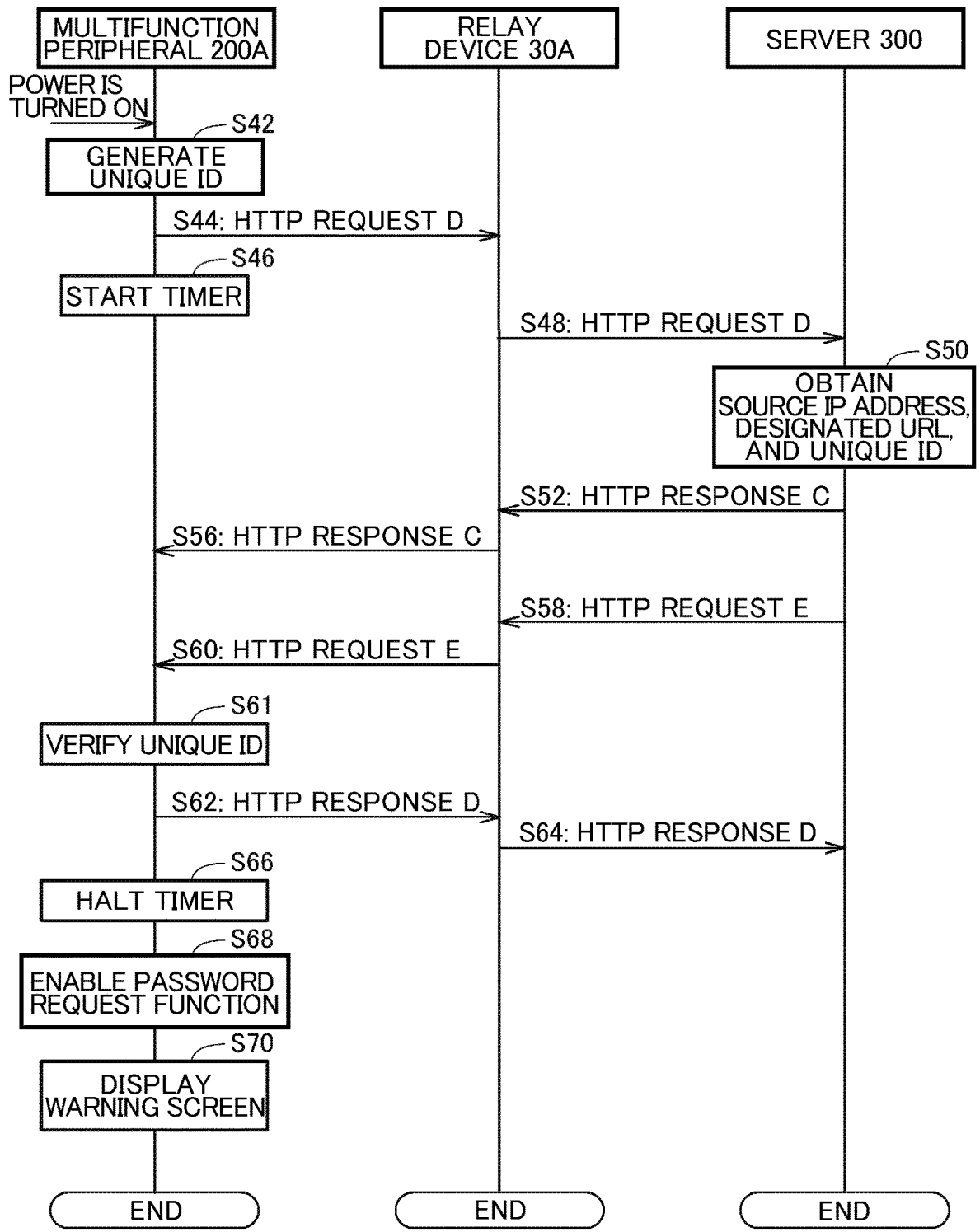

FIG. 5(A)

FIRST EMBODIMENT
HTTP REQUEST D

- SOURCE IP ADDRESS = GIP_M
- DESTINATION IP ADDRESS = GIP_S
- DESIGNATED URL
- UNIQUE ID
- REQUEST TRANSMISSION COMMAND

FIG. 5(B)

FIRST EMBODIMENT
HTTP RESPONSE C

- SOURCE IP ADDRESS = GIP_S
- DESTINATION IP ADDRES = GIP_M

FIG. 5(C)

FIRST EMBODIMENT
HTTP REQUEST E

- SOURCE IP ADDRESS = GIP_S
- DESTINATION IP ADDRESS = GIP_M
- DESIGNATED URL
- UNIQUE ID

FIG. 5(D)

FIRST EMBODIMENT
HTTP RESPONSE D

- SOURCE IP ADDRESS = GIP_M
- DESTINATION IP ADDRES = GIP_S

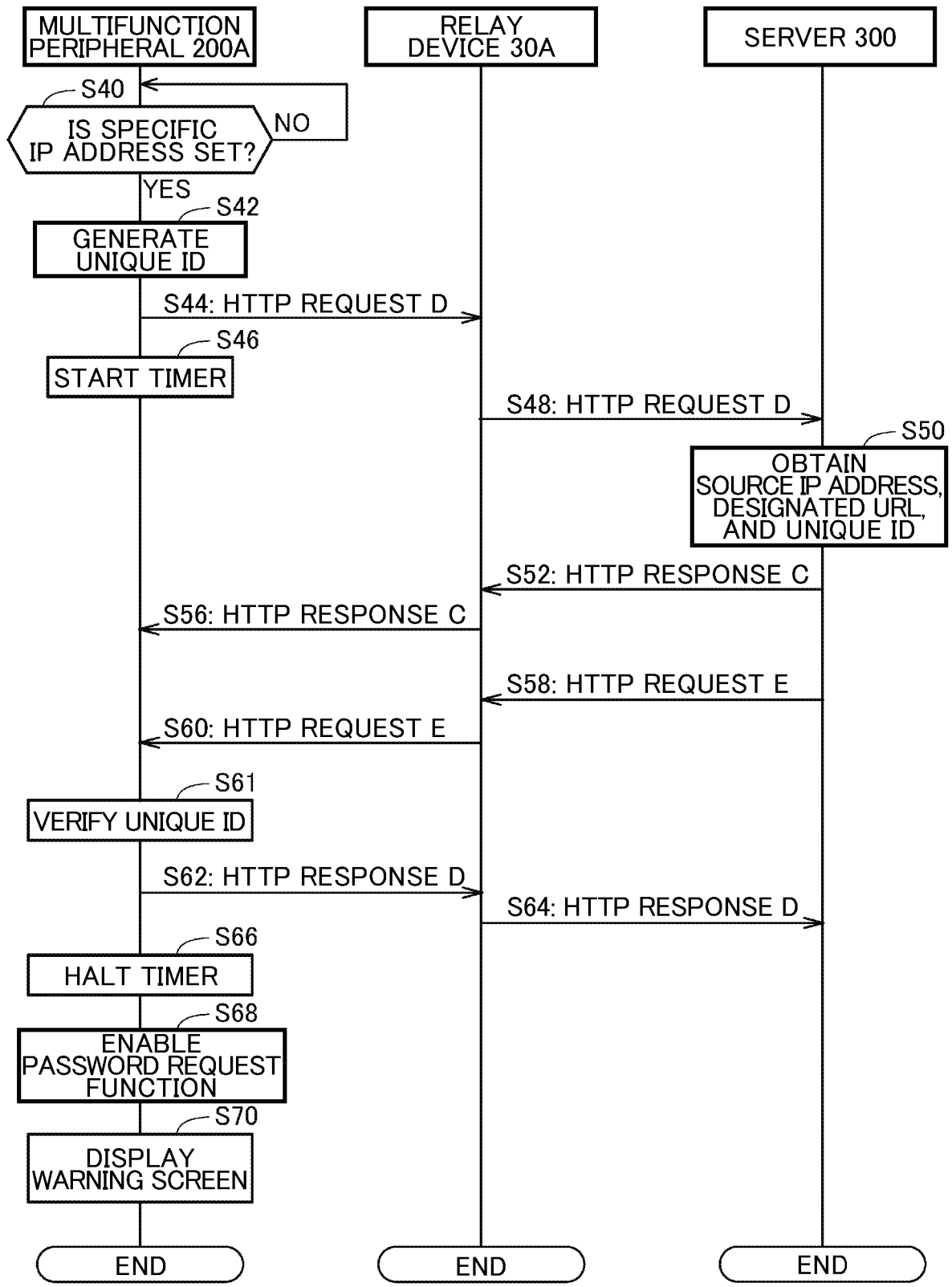

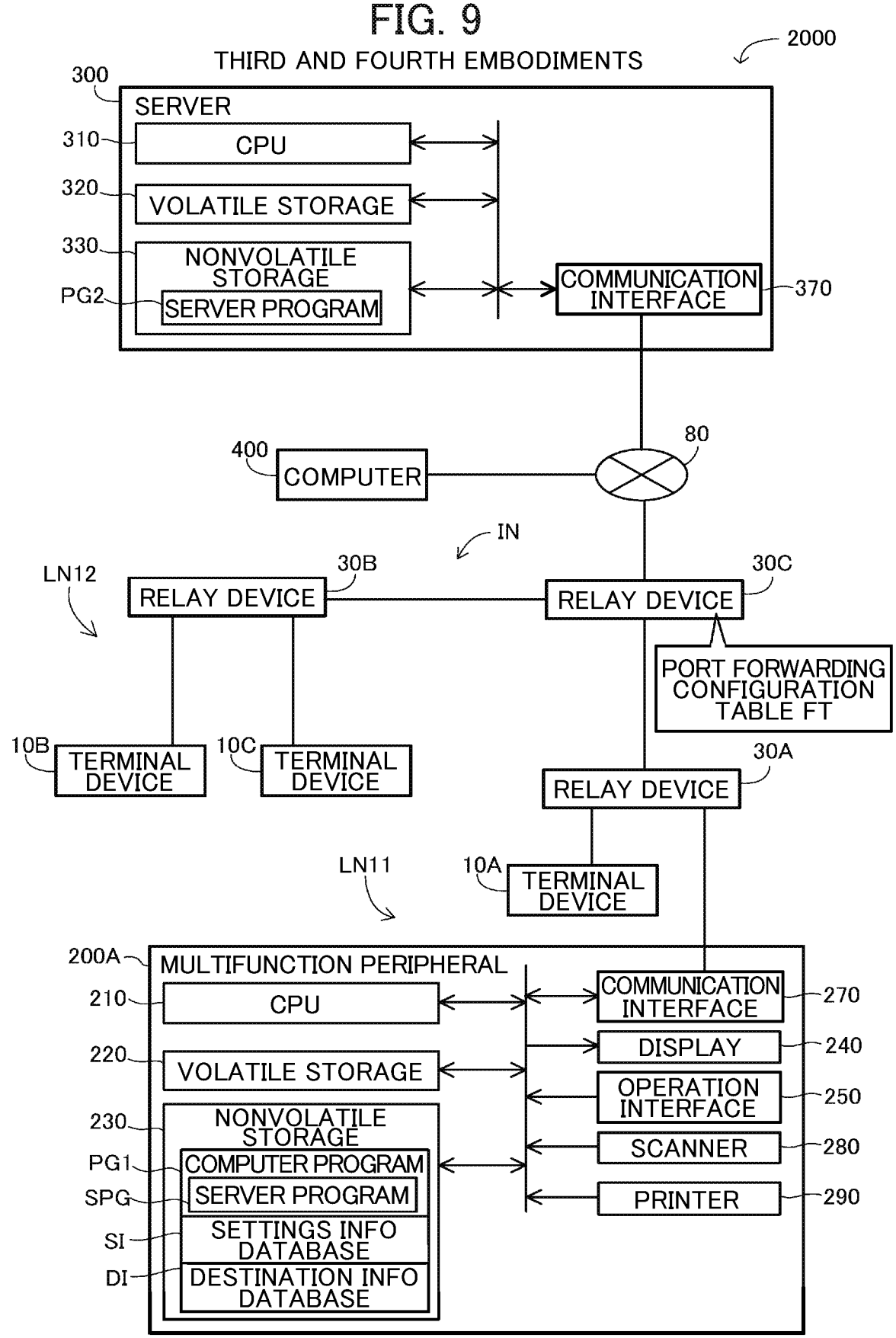

FIG. 10

PORT FORWARDING CONFIGURATION TABLE FT

| TARGET DESTINATION IP ADDRESS | TARGET PORT NUMBER | FORWARDING DESTINATION IP ADDRESS |
|---|---|---|
| GIP R (RELAY DEVICE 30C) | PNweb | LIP M (MULTIFUNCTION PERIPHERAL 200A) |

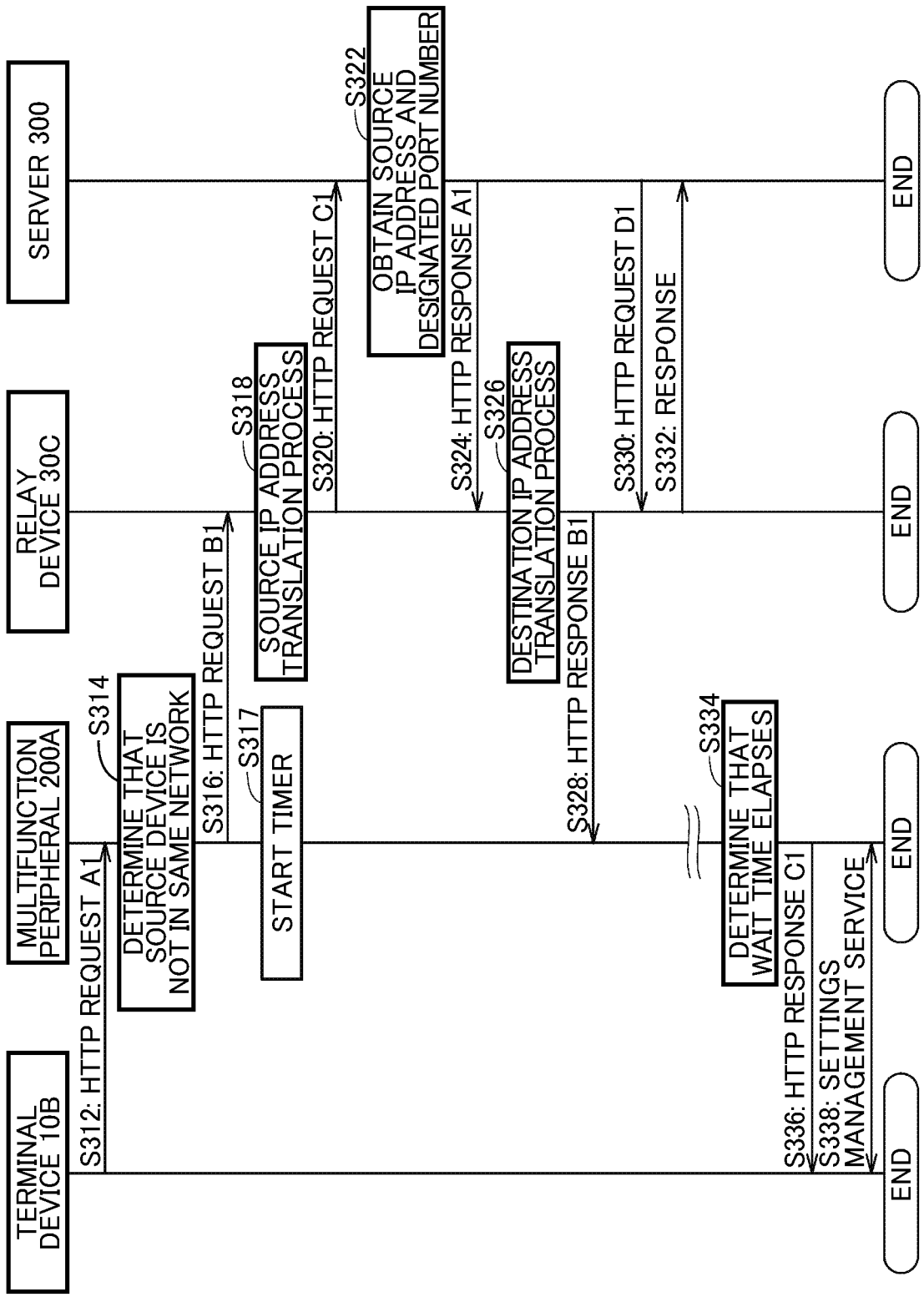

FIG. 13(A)

THIRD EMBODIMENT
HTTP REQUEST A1

- SOURCE IP ADDRESS = LIP_Tb
- DESTINATION IP ADDRESS = LIP_M
- DESTINATION PORT NUMBER: PNweb

FIG. 13(B)

THIRD EMBODIMENT
HTTP REQUEST B1

- SOURCE IP ADDRESS = LIP_M
- DESTINATION IP ADDRESS = GIP_S
- DESIGNATED PORT NUMBER: PNweb
- REQUEST TRANSMISSION COMMAND

FIG. 13(C)

THIRD EMBODIMENT
HTTP REQUEST C1

- SOURCE IP ADDRESS = GIP_R
- DESTINATION IP ADDRESS = GIP_S
- DESIGNATED PORT NUMBER: PNweb
- REQUEST TRANSMISSION COMMAND

FIG. 13(D)

THIRD EMBODIMENT
HTTP RESPONSE A1

- SOURCE IP ADDRESS = GIP_S
- DESTINATION IP ADDRESS = GIP_R

FIG. 13(E)

THIRD EMBODIMENT
HTTP RESPONSE B1

- SOURCE IP ADDRESS = GIP_S
- DESTINATION IP ADDRESS = LIP_M

FIG. 13(F)

THIRD EMBODIMENT
HTTP REQUEST D1

- SOURCE IP ADDRESS = GIP_S
- DESTINATION IP ADDRESS = GIP_R
- DESTINATION PORT NUMBER: PNweb

FIG. 13(G)

THIRD EMBODIMENT
ERROR RESPONSE

- SOURCE IP ADDRESS = GIP_R
- DESTINATION IP ADDRESS = GIP_S
- ERROR INFORMATION

FIG. 13(H)

THIRD EMBODIMENT
HTTP REQUEST E1

- SOURCE IP ADDRESS = GIP_S
- DESTINATION IP ADDRESS = LIP_M
- DESTINATION PORT NUMBER: PNweb

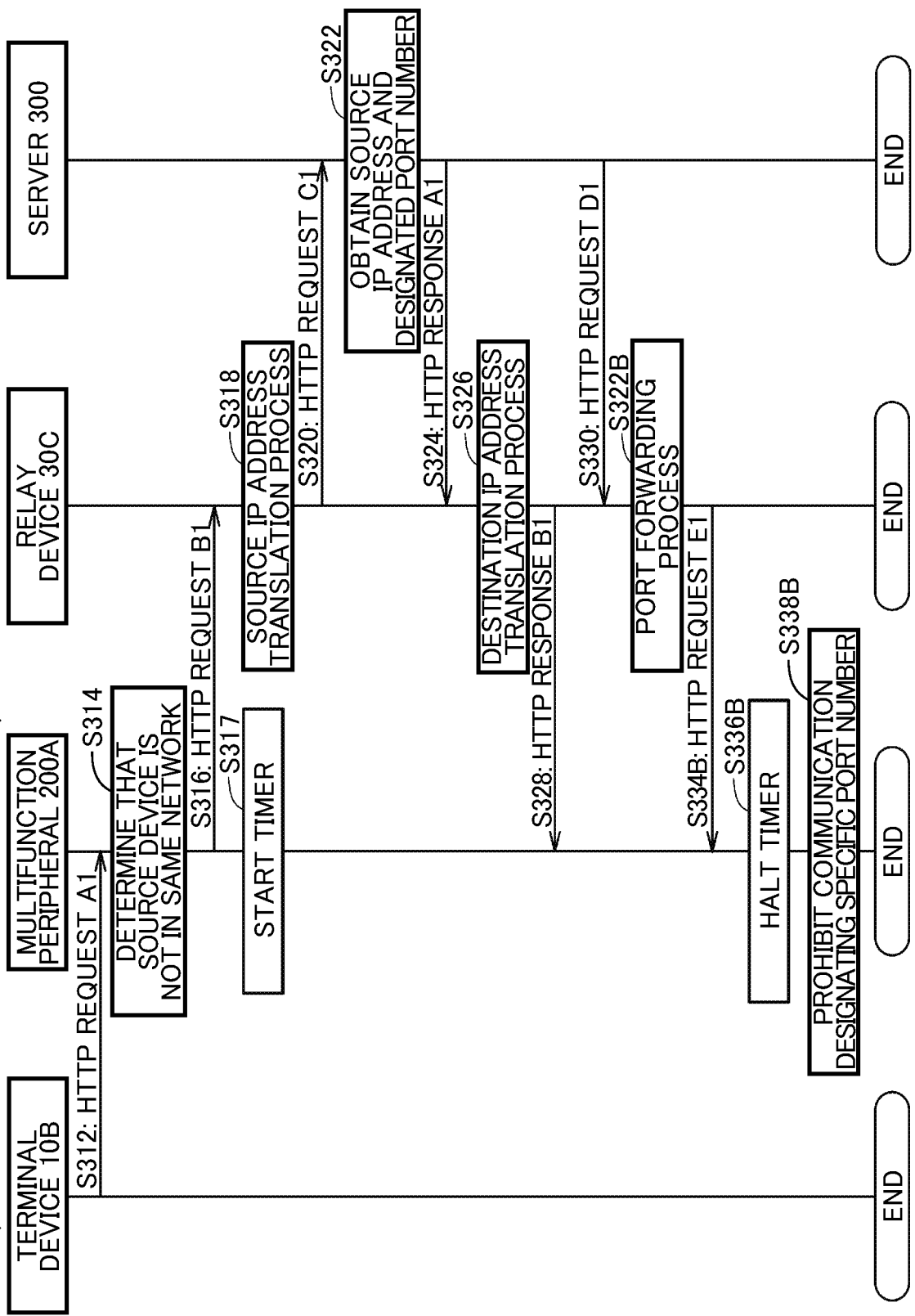
FIG. 14  A CASE WHERE HTTP REQUEST TRANSMITTED FROM EXTERNAL APPARATUS (NON-RECOMMENDED CONFIGURATION)

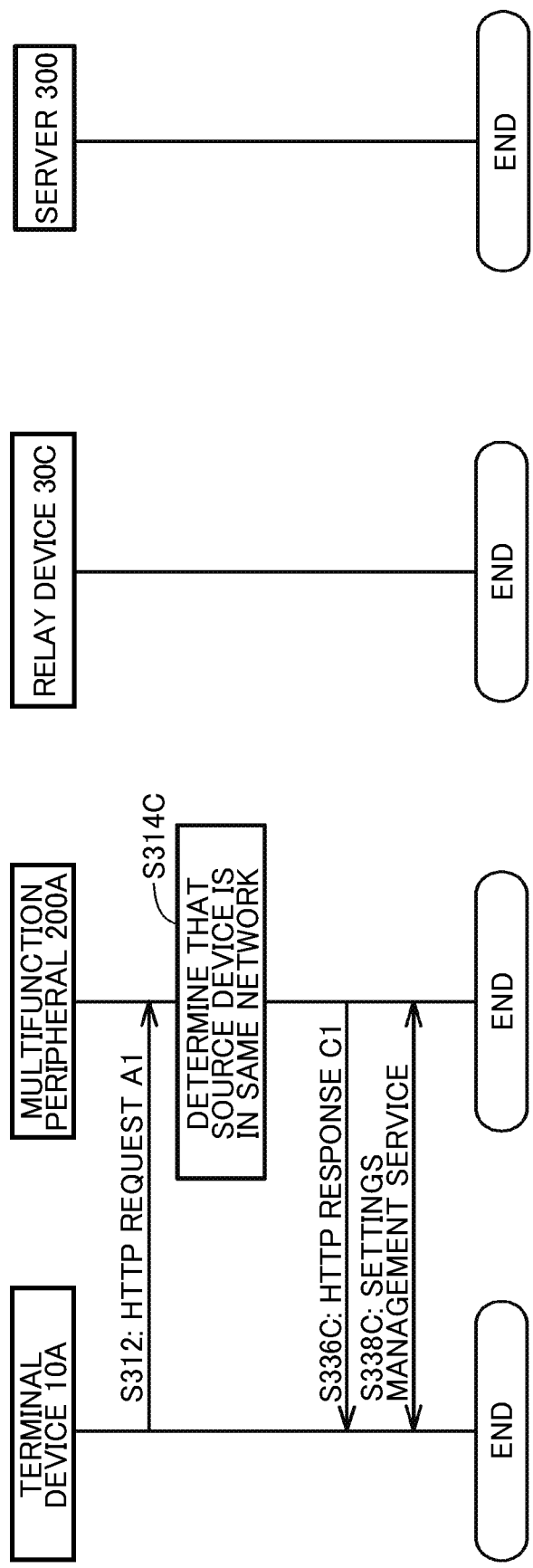

COMMUNICATION APPARATUS EXECUTING SPECIFIC PROCESS RELATED TO SECURITY

CROSS REFERENCE TO RELATED APPLICATION

This application claims priorities from Japanese Patent Application No. 2016-231555 filed Nov. 29, 2016 and Japanese Patent Application No. 2016-231641 filed Nov. 29, 2016. The entire content of each of the priority applications is incorporated herein by reference.

TECHNICAL FIELD

The present disclosure relates to a method for controlling a communication apparatus connected to an external apparatus via the Internet.

BACKGROUND

There are conventional technologies for confirming operations of a web server built into a video camera when attempting to make the web server publicly available on the Internet. When the user of the video camera presses a "Connect" button on the camera in order to publish a web server on the Internet, the video camera transmits its own IP address to an application server on the Internet. In response to receiving this IP address, the application server operating as a client transmits a request for prescribed content to this IP address. When the video camera receives this request for content, the video camera operating as a web server returns the prescribed content to the application server. The video camera displays an error message if a request for content is not received within a prescribed length of time period.

SUMMARY

However, the communication apparatus may have generally security issues in a case where a third party apparatus not anticipated by the user of the communication apparatus is capable of communicating with the communication apparatus. The conventional technology described above employs a configuration for receiving requests from application servers operating (or functioning) as clients when the video camera attempts to publish the web server on the Internet. However, when there is potential for the communication apparatus to have security issues, the conventional technology may be unable to adequately perform security-related processes since the technology has not anticipated conditions for receiving data from external apparatuses operating as clients.

In view of the foregoing, it is an object of the present disclosure to provide a technology capable of adequately executing security-related processes by receiving data from an external apparatus operating as a client when there is potential for the communication device to have security issues.

In order to attain the above and other objects, the disclosure provides a communication apparatus. The communication apparatus includes a processor and a memory. The memory stores computer-readable instructions therein. The computer-readable instructions, when executed by the processor, causes the communication apparatus to perform: transmitting to a first external apparatus, which is connected to the communication apparatus via Internet, a request to request data transmission while the communication apparatus functions as a client and the first external apparatus functions as a server; after transmitting the request, receiving specific data as a response to the request from a second external apparatus which is connected to the communication apparatus via the Internet while the second external apparatus functions as a client and the communication apparatus functions as a server; and executing a specific process related to security after receiving the specific data.

BRIEF DESCRIPTION OF THE DRAWINGS

The particular features and advantages of the disclosure as well as other objects will become apparent from the following description taken in connection with the accompanying drawings, in which:

FIGS. 3(A)-3(F) are explanatory diagrams illustrating a first set of examples of requests and responses used in the settings confirmation process according to the first embodiments, wherein FIG. 3(A) illustrates HTTP request A, FIG. 3(B) illustrates HTTP request B, FIG. 3(C) illustrates HTTP response A, FIG. 3(D) illustrates HTTP response B, FIG. 3(E) illustrates HTTP request C, and FIG. 3(F) illustrates an error response;

FIG. 4 is a second sequence diagram for the settings confirmation process of the first embodiment;

FIGS. 5(A)-5(D) are explanatory diagrams illustrating a second set of examples of requests and responses used in the settings confirmation process, wherein FIG. 5(A) illustrates HTTP request D, FIG. 5(B) illustrates HTTP response C, FIG. 5(C) illustrates HTTP request E, and FIG. 5(D) illustrates HTTP response D;

FIG. 7 is a second sequence diagram for the settings confirmation process according to the second embodiment;

FIGS. 8(A)-8(D) are explanatory diagrams illustrating variations of the first and second embodiments, wherein FIG. 8(A) is a part of a flowchart of a variation (1-1), FIG. 8(B) is a part of a flowchart of a variation (1-2), FIG. 8(C) is a part of a flowchart of a variation (1-3), and FIG. 8(D) is a part of a flowchart of a variation (1-4);

FIG. 9 is a block diagram illustrating a configuration of a system according to third and fourth embodiments;

FIG. 10 is an explanatory diagram illustrating a port forwarding configuration table;

FIG. 12 is a first sequence diagram for the settings confirmation process of the third embodiment;

FIGS. 13(A)-13(H) are explanatory diagrams illustrating a set of examples of requests and responses used in the settings confirmation process, wherein FIG. 13(A) illustrates HTTP request A1, FIG. 13(B) illustrates HTTP request B1, FIG. 13(C) illustrates HTTP request C1, FIG. 13(D) illustrates HTTP response A1, FIG. 13(E) illustrates HTTP response B1, FIG. 13(F) illustrates HTTP request D1, FIG. 13(G) illustrates an error response, and FIG. 13(H) illustrates HTTP request E1;

FIG. 14 is a second sequence diagram for the settings confirmation process of the third embodiment;

FIG. 15 is a third sequence diagram for the settings confirmation process of the third embodiment.

DETAILED DESCRIPTION

A. First Embodiment

A-1: Structure of a System 1000

Figure 1:
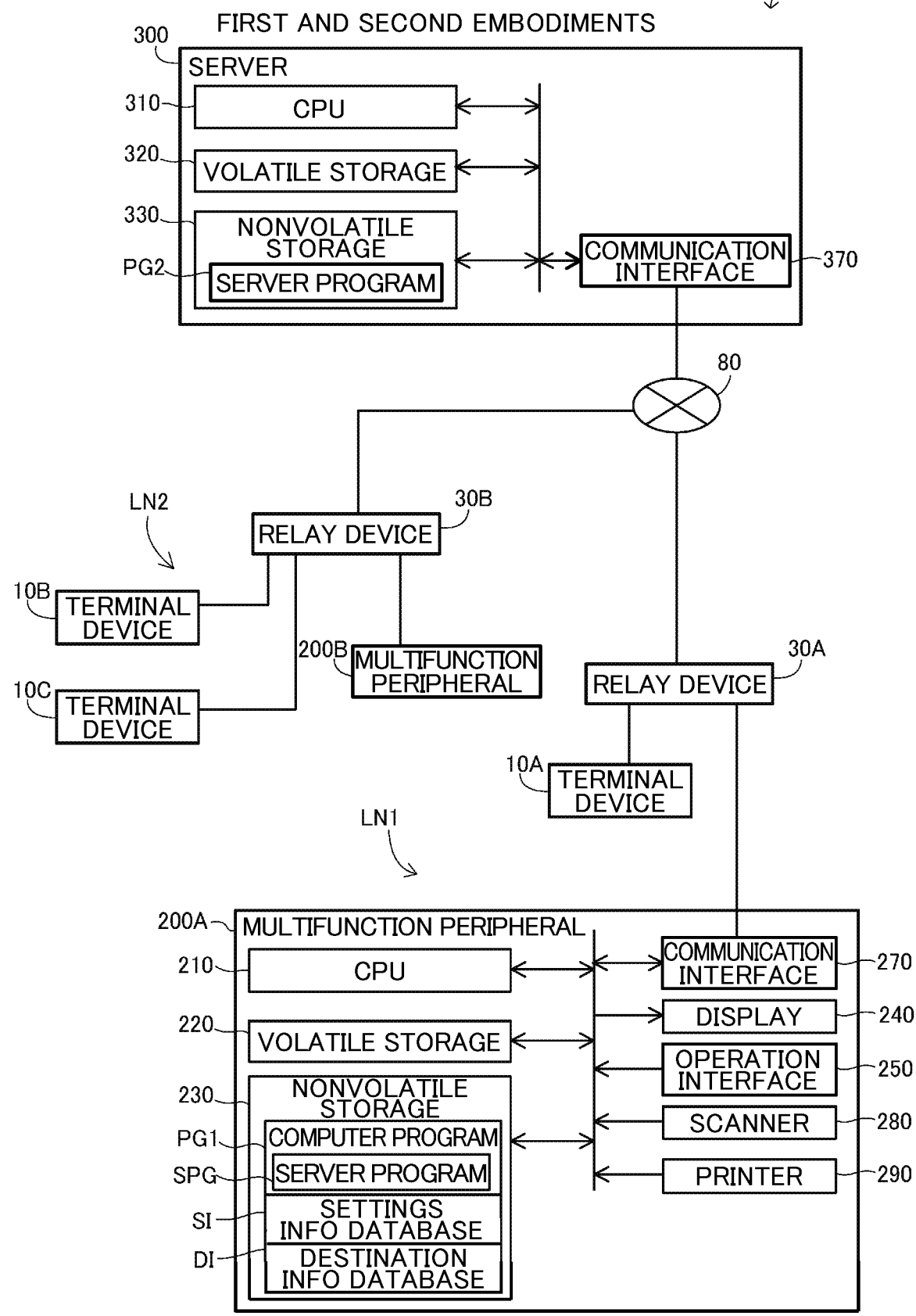
FIG. 1 is a block diagram illustrating a configuration of a system according to first and second embodiments.

Next, a first embodiment will be described while referring to the accompanying drawings. FIG. 1 is a block diagram showing the structure of a system 1000.

The system 1000 includes multifunction peripherals 200A and 200B, terminal devices 10A-10C, a server 300, and relay devices 30A and 30B. The multifunction peripheral 200A and the terminal device 10A are connected to a local area network LN1. The multifunction peripheral 200B and the terminal devices 10B and 10C are connected to a local area network LN2. The local area network LN1 is connected to the relay device 30A, and the local area network LN2 is connected to the relay device 30B. The relay devices 30A and 30B are each connected to an Internet 80 via an Internet service provider (not shown). The server 300 is connected to the Internet 80. Thus, the multifunction peripheral 200A is connected to the terminal device 10A via the local area network LN1 and is connected to the server 300 via the local area network LN1 and the Internet 80.

The multifunction peripheral 200A includes a CPU 210 serving as the controller or the processor of the multifunction peripheral 200A; a volatile storage 220, such as RAM; a nonvolatile storage 230, such as a hard disk drive or flash memory; a display 240, such as a liquid crystal display; an operation interface 250, such as a touchscreen laid over a liquid crystal panel, buttons, and the like; a communication interface 270; a scanner 280; and a printer 290.

The scanner 280 uses a photoelectric transducer configured of a CCD or CMOS image sensor to optically read a document or other object and generates scan data representing the image read by the photoelectric transducer. The printer 290 prints images on paper (an example of the printing medium) according to a prescribed method (laser method or inkjet method, for example).

The volatile storage 220 provides a buffer region for temporarily storing various intermediate data that is generated when the CPU 210 executes processes. The nonvolatile storage 230 stores a computer program (control program) PG1, a settings information database SI, and a destination information database DI. The volatile storage 220 and the nonvolatile storage 230 are internal memory of the multifunction peripheral 200A. The destination information database DI is an example of the storage. The settings information database SI is an example of the storage.

The computer program PG1 may be pre-stored in the nonvolatile storage 230 when the multifunction peripheral 200A is manufactured. Alternatively, the computer program PG1 may be stored and provided on a CD-ROM or other media or may be made available for download from a server connected over the Internet.

The CPU 210 performs control of the multifunction peripheral 200A by executing the computer program PG1. For example, the CPU 210 executes a printing process, a scanning process, or a facsimile process in response to a user command A printing process controls the printer 290 to print an image. A scanning process controls the scanner 280 to optically read an object and generate scan data. A facsimile process includes a process to transmit scan data generated through a scanning process over a telephone line as fax data, and a process to control the printer 290 to print an image based on fax data received over a telephone line. The computer program PG1 additionally includes a server program SPG. The CPU 210 can implement web server functions by executing the server program SPG. The printing process, the scanning process, and the facsimile process are examples of the specific image process. The printer 290 and the scanner 280 are examples of the image processing machine. By executing the server program PG1, the CPU 210 executes a settings confirmation process described later in conjunction with the server 300.

Web server functions are functions as servers that conform to Hypertext Transfer Protocol (HTTP). One example of a function of a web server is to provide the terminal device 10A used by the user of the multifunction peripheral 200A with a settings management service for allowing the user to acquire or modify settings information that is related to the multifunction peripheral 200A and stored in the settings information database SI.

The web server function of the multifunction peripheral 200A is intended to provide services to client devices on the local area network LN1, and specifically to the terminal device 10A. The web server function of the multifunction peripheral 200A is not intended for providing services to external apparatuses via the Internet 80. Therefore, from a security standpoint it is preferable that external apparatuses cannot transmit HTTP requests to the multifunction peripheral 200A over the Internet 80.

Settings information related to the multifunction peripheral 200A includes various settings information stored in the settings information database SI, such as information related to the (specific) image processes, the network, the display 240, and the operation interface 250.

Settings information related to image processes includes settings information related to printing processes, and settings information related to scanning processes. The settings information for image processes may also include personal information. The settings information related to scanning processes may include scan profiles, for example. A scan profile is information that groups values of settings for a plurality of scanning processes. The scan profile may include the scanning resolution and number of colors (monochrome, full color, etc.) for the scan data being generated, as well as personal information such as the e-mail address to which the scan data is to be transmitted.

Settings information related to the network may include the IP address assigned to the multifunction peripheral 200A, and general settings information for communications conforming to TCP/IP, such as information specifying the subnet mask and default gateway. By specifying an external storage server (not shown) connected to the multifunction peripheral 200A over the Internet 80 as the destination for scan data, the multifunction peripheral 200A can store scan data on the storage server. Settings information related to the network may also include information for communicating with the external storage server (the URL of the external server, for example), and information specifying whether communication with the external server is allowed.

The destination information database DI includes destination information for a facsimile process, such as the fax number to which fax data is to be transmitted, or an e-mail address as the destination for scan data.

The communication interface 270 includes an interface for performing data communications with external apparatuses. In the embodiment, the communication interface 270 includes an interface for connecting to the local area network LN1, and specifically a wired or wireless interface conforming to Ethernet (registered trademark) and Wi-Fi specifications. The communication interface 270 also includes a USB interface for performing data communications conforming to the Universal Serial Bus (USB) standard. Accordingly, external storage devices such as USB memory devices may be connected to the communication interface 270.

The structure of the multifunction peripheral 200B is identical to that of the multifunction peripheral 200A described above.

The vendor of the multifunction peripherals 200A and 200B provides the server 300. The server 300 includes a CPU 310 as the controller of the server 300; a volatile storage 320, such as RAM; a nonvolatile storage 330, such as a hard disk drive; and a communication interface 370 for connecting to the Internet 80.

The volatile storage 320 provides a buffer region for temporarily storing various intermediate data generated when the CPU 310 performs processes. The nonvolatile storage 330 stores a server program PG2. By executing the server program PG2, the CPU 310 executes a settings confirmation process described later in conjunction with each of the multifunction peripherals 200A and 200B.

In the settings confirmation process described later, it will be assumed that the multifunction peripherals 200A and 200B transmit an HTTP request to the server 300 via the Internet 80. For this reason, a global IP address "GIP_S" is assigned to the server 300.

The terminal devices 10A-10C are well-known computers, such as personal computers or smartphones. The terminal device 10A can communicate with the multifunction peripheral 200A through the local area network LN1 in order to use the functions of the multifunction peripheral 200A. For example, the terminal device 10A can transmit a print job to the multifunction peripheral 200A so as to instruct the multifunction peripheral 200A to perform printing. The terminal device 10A may also communicate with the web server function of the multifunction peripheral 200A to modify or acquire settings information for the same. The terminal devices 10B and 10C can similarly use the functions of the multifunction peripheral 200B through the local area network LN2.

The relay device 30A can function as a hub, a router, and a data circuit-terminating device. A hub function relays communications between devices on the local area network LN1, such as communications between the terminal device 10A and multifunction peripheral 200A. The router function relays communications between devices on the local area network LN1 and devices on another network such as the Internet 80. The function of data circuit-terminating device performs conversion between signals (such as signals in Ethernet) used on the local area network LN1, and signals (such as optical or ADSL signals) used for communications between the relay device 30A and an Internet service provider. The data circuit-terminating device is an Optical Network Unit (ONU) in the case of an optical line, and a modem in the case of an ADSL line. While the functions for a hub, a router, and a data circuit-terminating device are all implemented on a single device in the embodiment (the relay device 30A in this example), these functions may be implemented on two or more devices.

Under the recommended network settings of the system 1000 (hereinafter called "recommended configuration"), a global IP address is assigned to the relay device 30A (the router), and local IP addresses (also called "private IP addresses") are assigned to devices on the local area network LN1, such as the terminal device 10A and the multifunction peripheral 200A. Global IP addresses are unique IP addresses not duplicated among devices on the Internet and are used for communicating via the Internet 80. Local IP addresses are used for communications within the local area network and should not be duplicated among devices on the local IP address. "LIP_M" is assigned to the multifunction peripheral 200A and the global IP address "GIP_R" is assigned to the relay device 30A in the recommended configuration.

Under the recommended configuration, the relay device 30A implements a function for modifying address information (or address modifying function) called Network Address Translation (NAT) or Network Address Port Translation (NAPT). As the address modifying function, the relay device 30A executes a source IP address translation process when relaying a request from the local area network LN1 to the Internet 80, and a destination IP address translation process when relaying a response from the Internet 80 to the local area network LN1. For example, the multifunction peripheral 200A on the local area network LN1 may transmit a request (such as an HTTP request) to an external apparatus on the Internet 80 via the relay device 30A, or may receive a response to the request, such as an HTTP response, from an external apparatus. When relaying a request transmitted from the multifunction peripheral 200A to an external apparatus, the relay device 30A modifies the source IP address of the request from the local IP address "LIP_M" of the multifunction peripheral 200A to the global IP address "GIP_R" of the relay device 30A (the source IP address translation process). At this time, the relay device 30A records modification history for the IP address. When relaying a response from an external apparatus to the multifunction peripheral 200A, the relay device 30A references the recorded modification history and changes the destination IP address of the response from the global IP address "GIP_R" of the relay device 30A to the local IP address "LIP_M" of the multifunction peripheral 200A (destination IP address translation process). The relay device 30A deletes the modification history referenced in this process after the response has been relayed.

Under the recommended configuration, data cannot be transmitted from an external apparatus to the multifunction peripheral 200A in general unless a request is first transmitted from the multifunction peripheral 200A to the external apparatus and the modification history of the IP address of the multifunction peripheral 200A is recorded on the relay device 30A. Therefore, it is possible to transmit a request from the multifunction peripheral 200A side to an external apparatus initially while the multifunction peripheral 200A functions as the client and the external apparatus functions as the server. However, it is not possible to transmit a request from the external apparatus to the multifunction peripheral 200A initially while the multifunction peripheral 200A functions as the server and the external apparatus functions as the client. Thus, under the recommended configuration, an external apparatus belonging to a third party (a malicious hacker, for example) will have difficulty communicating with the multifunction peripheral 200A, even when knowing the global IP address of the relay device 30A.

In some cases, network settings of the system 1000 other than the recommended configuration (hereinafter called a "non-recommended configuration") may be used. A global IP address is assigned to the multifunction peripheral 200A under a non-recommended configuration. In this case, the relay device 30A operates as a hub and a data circuit-terminating device, but does not operate as a router, for example, and an IP address is not assigned to the relay device 30A. Alternatively, the relay device 30A may operate as a hub, router, and data circuit-terminating device while not implementing the address modifying function described above, and a global IP address different from the multifunction peripheral 200A may be assigned to the relay device 30A. In the non-recommended configuration, the global IP address "GIP_M" is assigned to the multifunction peripheral 200A in this example.

Under a non-recommended configuration, an external apparatus can transmit a request to the multifunction peripheral 200A initially, while the multifunction peripheral 200A functions as the server and the external apparatus functions as the client, provided that the external apparatus knows the global IP address "GIP_M" of the multifunction peripheral 200A. Accordingly, the external apparatus of a third party can more easily communicate with the multifunction peripheral 200A under a non-recommended configuration than under the recommended configuration. As a result, there is greater potential for a third party to use the settings management service provided by the multifunction peripheral 200A so as to tamper with settings information in the settings information database SI, or to gain access to destination information in the destination information database DI, for example. Hence, the security level under a non-recommended configuration is lower than that under the recommended configuration and may give rise to security issues. Such a non-recommended configuration may be employed when the administrator of the multifunction peripheral 200A has insufficient knowledge of security issues, for example.

The recommended configuration and the non-recommended configurations may similarly be applied to the local area network LN2 to which the terminal devices 10B and 10C and the multifunction peripheral 200B are connected, and the relay device 30B.

A-2: Operations of the System 1000

In the first embodiment, a settings confirmation process is performed to determine whether the recommended configuration has been established or whether a non-recommended configuration is being used. This settings confirmation process is executed by the CPU 210 of the multifunction peripheral 200A or 200B and the CPU 310 of the server 300. The following description of the settings confirmation process will use the example of a process executed by the multifunction peripheral 200A and the server 300, but the process executed by the multifunction peripheral 200B and the server 300 is identical. In the first embodiment, the settings confirmation process is executed when the power to the multifunction peripheral 200A is turned on. Here, the "settings confirmation process is executed when the power to the multifunction peripheral 200A is turned on" signifies that the CPU 210 begins executing the settings confirmation process as part of a series of processes that the CPU 210 automatically executes when the power to the multifunction peripheral 200A is turned on. These automated processes in the series of processes include processes for starting up the operating system (OS) and file system.

A-2-1: Operations Performed Under the Recommended Configuration

Figure 2:
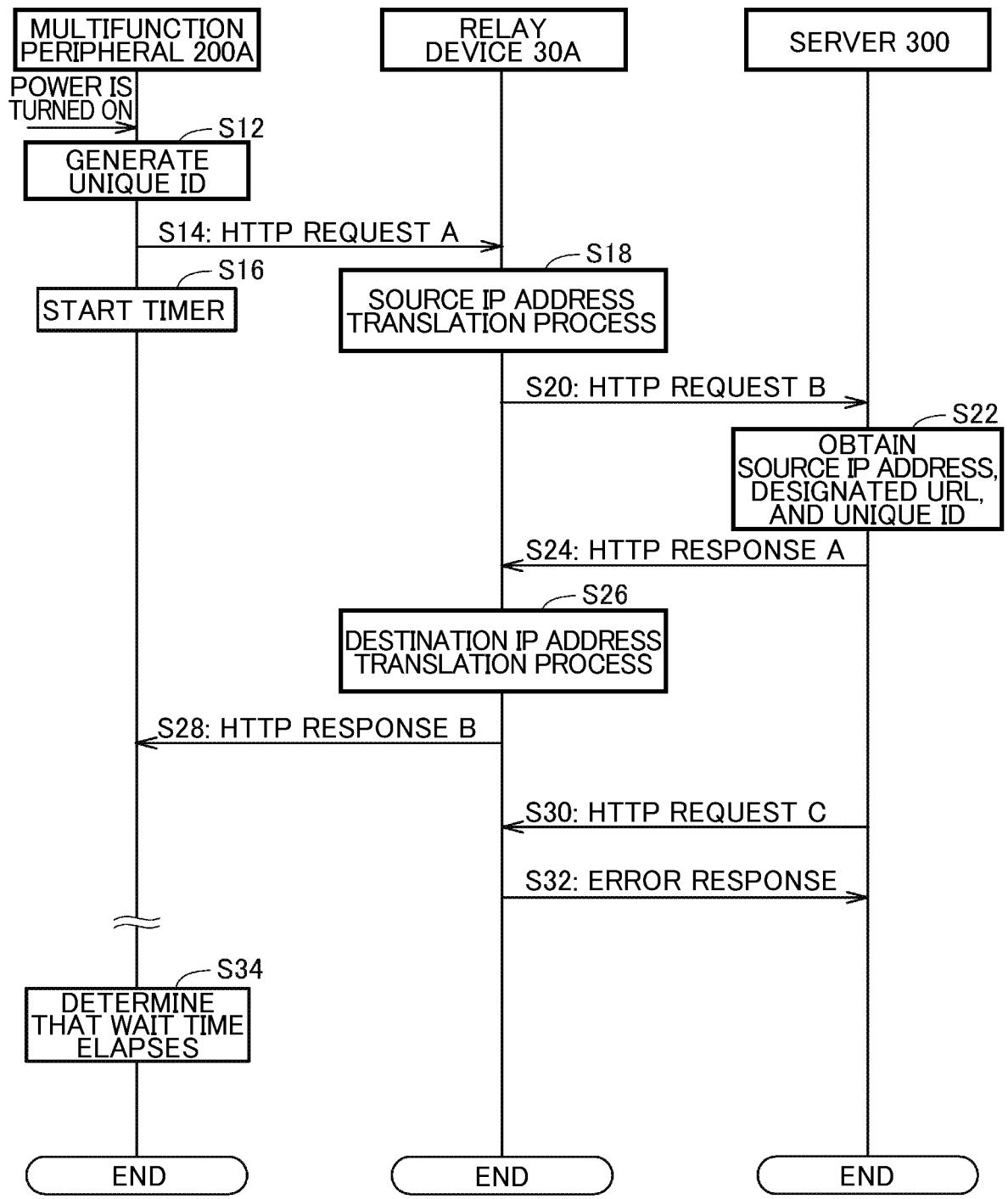
FIG. 2 is a first sequence diagram for a settings confirmation process according to the first embodiment.

FIG. 2 is a first sequence diagram for the settings confirmation process according to the first embodiment. The first sequence diagram shows the sequence of operations performed when the recommended configuration has been set.

In S12 of FIG. 2, the CPU 210 generates a unique ID for the settings confirmation process. The unique ID is information that differs each time the settings confirmation process is executed and that differs for each device (the multifunction peripheral 200A, for example) executing the settings confirmation process. For example, the CPU 210 may calculate the unique ID using a prescribed formula that has the MAC address (Media Access Control address) of the multifunction peripheral 200A and the current time and date as input values, and the unique ID as an output value.

In S14 the CPU 210 transmits HTTP request A to the local area network LN1. In this example, the relay device 30A is set as the default gateway. Accordingly, the destination MAC address in HTTP request A is set to the MAC address of the relay device 30A, and thus HTTP request A is transmitted to the relay device 30A.

FIGS. 3(A)-3(F) are diagrams illustrating a first set of examples of requests and responses used in the settings confirmation process. As shown in FIG. 3(A), the IP header of HTTP request A transmitted in S14 includes the source IP address and the destination IP address. The source IP address included in the IP header of HTTP request A is the IP address of the multifunction peripheral 200A, and specifically the local IP address "LIP_M". The destination IP address included in the IP header is the global IP address "GIP_S" of the server 300.

The body of HTTP request A includes the unique ID generated in S12 and a designated URL. The designated URL is used as the destination URL for an HTTP request C that the server 300 transmits in S30 described later. The global IP address "GIP_S" and the designated URL used in this process are pre-stored in the nonvolatile storage 230 by the vendor of the multifunction peripheral 200A.

HTTP request A further includes a request transmission command. The request transmission command is a command instructing transmission of the HTTP request to the server 300. The request transmission command may be included in the body of the HTTP request or may be included in the destination URL of the HTTP header as a special URL denoting a request transmission command.

After transmitting HTTP request A, in S16 the CPU 210 starts a timer for counting a prescribed wait time WT. The wait time WT is a period of a few seconds, for example.

For the recommended configuration, the relay device 30A implements an address conversion function. Accordingly, in a case where HTTP request A is received, in S18 the relay device 30A executes the source IP address translation process as described above. That is, the relay device 30A converts HTTP request A into HTTP request B shown in FIG. 3(B). More specifically, the relay device 30A modifies the source IP address included in the IP header of HTTP request A to the global IP address "GIP_R" of the relay device 30A. The relay device 30A also records a modification record of the IP address therein as the modification history.

In S20 the relay device 30A transmits HTTP request B (see FIG. 3(B)) over the Internet 80. As described above, HTTP request B is obtained by modifying the source IP address in HTTP request A. The server 300 receives HTTP request B via the Internet 80.

In S22 the CPU 310 of the server 300 extracts (or obtains) the source IP address included in the IP header of HTTP request B and the designated URL and the unique ID included in the HTTP body of HTTP request B. When the recommended configuration has been established, the server 300 acquires the global IP address "GIP_R" of the relay device 30A, as shown in FIG. 3(B).

In S24 the CPU 310 transmits HTTP response A (see FIG. 3(C)) over the Internet 80 as a response to HTTP request B. The source IP address included in the IP header of HTTP response A is the global IP address "GIP_S" of the server 300. The destination IP address included in the IP header is the global IP address (or the source IP address) extracted in S22, i.e., the global IP address "GIP_R" of the relay device 30A. The relay device 30A receives HTTP response A via the Internet 80.

In a case where HTTP response A is received, in S26 the relay device 30A executes the destination IP address translation process described above. That is, the relay device 30A converts HTTP response A into HTTP response B shown in FIG. 3(D). Specifically, the relay device 30A references the modification record of the IP address recorded in the source IP address translation process of S18 and modifies the destination IP address in the IP header of HTTP response A to the local IP address "LIP_M" of the multifunction peripheral 200A on the basis of the referenced modification record. The relay device 30A subsequently deletes the modification record of the IP address referenced in S26.

In S28 the relay device 30A transmits HTTP response B (see FIG. 3(D)) to the local area network LN1. As described above, HTTP response B is obtained by modifying the destination IP address in HTTP response A. The multifunction peripheral 200A receives HTTP response B via the local area network LN1.

The transmission and reception of HTTP requests A and B in S14 and S20, and the transmission and reception of HTTP responses A and B in S24 and S28, are communications in which the multifunction peripheral 200A functions as the client in conformance with HTTP and the server 300 functions as the server in conformance with HTTP.

In S30 the CPU 310 of the server 300 transmits HTTP request C (see FIG. 3(E)) over the Internet 80 in response to (or as a response to) the request transmission command included in HTTP request B (see FIG. 3(B)). The source IP address in the IP header of HTTP request C is the global IP address "GIP_S" of the server 300. The destination IP address included in the IP header of HTTP request C is the global IP address obtained in S22, i.e., the global IP address "GIP_R" of the relay device 30A.

The CPU 310 also adds the designated URL extracted in S22 (see FIG. 3(B)) in the HTTP header of HTTP request C as the destination URL, and the unique ID extracted in S22 (see FIG. 3(B)) in the HTTP body of HTTP request C. The relay device 30A receives HTTP request C via the Internet 80.

The transmission of HTTP request C in S30 is communications in which the multifunction peripheral 200A functions as the server in conformance with HTTP and the server 300 functions as the client in conformance with HTTP. In this way, the multifunction peripheral 200A and the server 300 can operate (or function) both as clients and servers in conformance with HTTP.

In a case where HTTP request C is received, the relay device 30A recognizes that the destination IP address is the address of the relay device 30A, but has no modification record of a corresponding source IP address translation process. Hence, the relay device 30A discards HTTP request C without performing the destination IP address translation process and without relaying HTTP request C. In S32 the relay device 30A transmits an error response (see FIG. 3(F)) to the Internet 80 indicating that the destination of HTTP request C is incorrect. The source IP address in the error response is the global IP address "GIP_R" of the relay device 30A, while the destination IP address is the global IP address "GIP_S" of the server 300. Accordingly, the server 300 receives this error response. The error response may include error information indicating that the destination of HTTP request C is incorrect.

As described above, HTTP request C transmitted from the server 300 in response to (or as a response to) the request transmission command included in HTTP request A transmitted from the multifunction peripheral 200A does not reach the multifunction peripheral 200A when the recommended configuration has been established. That is, when using the recommended configuration, an HTTP request does not reach the multifunction peripheral 200A in communications performed while the multifunction peripheral 200A functions as the server in conformance with HTTP and the server 300 functions as the client in conformance with HTTP. Consequently, the wait time WT counted from a timing of S16 elapses without the multifunction peripheral 200A receiving HTTP request C.

In a case where the wait time WT elapses, in S34 the CPU 210 of the multifunction peripheral 200A determines that the wait time WT has elapsed from a timing of S16 on the basis of the timer started in S16. In this case, the multifunction peripheral 200A can determine that the current network settings are the recommended configuration and that the IP address assigned to the multifunction peripheral 200A is a local IP address. Hence, since the CPU 210 can determine that there are no security-related issues, the CPU 210 can end the settings confirmation process without further change.

A-2-2: Operations Performed Under a Non-Recommended Configuration

FIG. 4 is a second sequence diagram for the settings confirmation process of the first embodiment. The second sequence diagram shows the sequence of steps performed when a non-recommended configuration has been established. FIGS. 5(A)-5(D) are a second set of examples of requests and responses used in the settings confirmation process.

S42, S44, and S46 in FIG. 4 are identical to steps S12, S14, and S16 in FIG. 2. However, the source IP address included in the IP header of HTTP request D (see FIG. 5(A)) transmitted in S44 is different from the source IP address in HTTP request A (see FIG. 3(A)) transmitted in S14 of FIG. 2. When a non-recommended configuration is being used, the IP address assigned to the multifunction peripheral 200A is the global IP address "GIP_M". Therefore, the source IP address of HTTP request D transmitted in S44 is the global IP address "GIP_M". The relay device 30A receives this HTTP request D, as in the case of FIG. 2.

As described above, the relay device 30A does not implement an address modifying function when operating under a non-recommended configuration. Hence, in S48 the relay device 30A transmits HTTP request D directly to the Internet 80 with no change. The server 300 receives HTTP request D via the Internet 80.

In S50, as in S22 of FIG. 2, the CPU 310 of the server 300 extracts (or obtains) the source IP address in the IP header of HTTP request D and the designated URL and the unique ID included in the HTTP body of HTTP request D. Unlike in the case of the recommended configuration, the CPU 310 extracts the global IP address "GIP_M" of the multifunction peripheral 200A from the source IP address under a non-recommended configuration, as indicated in FIG. 5(A).

In S52, as in S24 of FIG. 2, the CPU 310 transmits HTTP response C (see FIG. 5(B)) to the Internet 80 in response to (or as a response to) HTTP request D. The source IP address included in the IP header of HTTP response C is the global IP address "GIP_S" of the server 300. The destination IP address included in the IP header is the global IP address (or the source IP address) extracted in S50, and specifically the global IP address "GIP_M" of the multifunction peripheral 200A. The relay device 30A receives HTTP response C via the Internet 80.

In a case where HTTP response C is received, in S56 the relay device 30A transmits HTTP response C to the local area network LN1 without change. In other words, the relay device 30A does not execute the destination IP address translation process which is performed under the recommended configuration (S26 of FIG. 2). The multifunction peripheral 200A receives HTTP response C via the local area network LN1.

In S58 the CPU 310 of the server 300 transmits an HTTP request E (see FIG. 5(C)) over the Internet 80 in response to (or as a response to) the request transmission command included in HTTP request D (see FIG. 5(A)). The source IP address included in the IP header of HTTP request E is the global IP address "GIP_S" of the server 300. The destination IP address included in the IP header of HTTP request E is the global IP address extracted in S50, and specifically the global IP address "GIP_M" of the multifunction peripheral 200A.

As in HTTP request C of FIG. 3(E), the CPU 310 generates HTTP request E so that the HTTP request E includes the designated URL in the header thereof and the unique ID extracted in S50 (FIG. 5(A)) in in the body thereof. The relay device 30A receives HTTP request E via the Internet 80.

In a case where HTTP request E is received, in S60 the relay device 30A transmits HTTP request E without change over the local area network LN1. The multifunction peripheral 200A receives HTTP request E via the local area network LN1.

In S61 the CPU 210 verifies whether the unique ID included in HTTP request E matches the unique ID generated in S42. In a case where the unique IDs are found to match through this verification, then the probability that HTTP request E was transmitted to the multifunction peripheral 200A over the Internet 80 in response to (or as a response to) the request transmission command included in HTTP request D is extremely high. Accordingly, in a case where the IDs are found to match, the multifunction peripheral 200A can determine that the HTTP request received from the relay device 30A is HTTP request E transmitted from the server 300.

In a case where these unique IDs do not match in the verification, the CPU 210 can determine that the HTTP request received from the relay device 30A is not HTTP request E transmitted from the server 300. In this case, the CPU 210 waits to receive the HTTP request E until the wait time WT has elapsed from a count start timing of S46.

In S62 the CPU 210 of the multifunction peripheral 200A transmits HTTP response D (see FIG. 5(D)) over the local area network LN1 in response to (or as a response to) HTTP request E. The source IP address in HTTP response D is the global IP address "GIP_M" of the multifunction peripheral 200A, and the destination IP address is the global IP address "GIP_S" of the server 300. The relay device 30A receives HTTP response D over the local area network LN1. In S64 the relay device 30A transmits HTTP response D over the Internet 80. The server 300 receives HTTP response D via the Internet 80. Note that steps S62 and S64 may be omitted as a variation.

As described above, the multifunction peripheral 200A receives HTTP request E transmitted from the server 300 in response to (or as a response to) the request transmission command included in HTTP request D transmitted from the multifunction peripheral 200A when a non-recommended configuration is being used. Here, the server 300 transmits HTTP request E (S58) within a time period that is sufficiently shorter than the wait time WT after the server 300 receives HTTP request D in S48. Therefore, the multifunction peripheral 200A receives HTTP request E from the server 300 before the wait time WT elapses from a count start timing of S46 under a non-recommended configuration. Thus, in a case where HTTP request E is received, the multifunction peripheral 200A can determine that the IP address assigned to the multifunction peripheral 200A is a global IP address, and a non-recommended configuration has been set.

In S66 the CPU 210 halts the timer started in S46. In S68 the CPU 210 enables a password request function. That is, when the password request function is disabled, the CPU 210 switches the function from disabled to enabled. The password request function is a function for requesting that a password be inputted as authentication information as a condition for providing the settings management service of the web server function. In other words, if the multifunction peripheral 200A receives an HTTP request requesting provision of the settings management service in a case where the password request function is enabled, the CPU 210 transmits web page data showing a password input screen to the source of the HTTP request. In a case where the correct password is inputted through this input screen, the CPU 210 provides the settings management service by transmitting web page data representing the settings management screen for the multifunction peripheral 200A to the source of the HTTP request. In a case where the correct password is not inputted in the input screen, the CPU 210 denies provision of the settings management service by not transmitting (or prohibiting from transmitting) web page data showing the settings management screen to the source of the HTTP request. As a variation, the authentication information may be information for a digital signature or encryption key. As another variation, the CPU 210 may deny provision of services different from the settings management service, such as a service for transmitting scan data to an external storage server, in a case where the correct password is not inputted.

In S70 the CPU 210 displays a warning screen for the user on the display 240 and subsequently ends the settings confirmation process. The warning screen may include a message indicating that the multifunction peripheral 200A is using a non-recommended configuration that has security-related issues, and a message prompting the user to modify the settings.

According to the first embodiment described above, when the power to the multifunction peripheral 200A is turned on, the multifunction peripheral 200A transmits a communication request to the server 300 requesting a data transmission to the multifunction peripheral 200A, and specifically transmits HTTP request D that includes a request transmission command (S44 of FIG. 4). After transmitting HTTP request D, the multifunction peripheral 200A receives specific data from the server 300, and specifically HTTP request E transmitted in response to (or as a response to) the request transmission command (S60 of FIG. 4). In a case where HTTP request E is received, the multifunction peripheral 200A executes a process to enable the password request function (S68 of FIG. 4) and a process to display a warning screen (S70 of FIG. 4). Thus, by receiving HTTP request E from the server 300 operating (or functioning) as a client in conformance with HTTP, the multifunction peripheral 200A can recognize the potential for security-related issues after the power to the multifunction peripheral 200A is turned on, when a non-recommended configuration is being used, for example. Accordingly, the multifunction peripheral 200A can execute appropriate processes for enabling the password request function and for displaying the warning screen.

According to the first embodiment described above, the multifunction peripheral 200A executes the process for enabling the password request function and the process for displaying a warning screen when HTTP request E is received within the wait time WT measured after the HTTP request D is transmitted. When the HTTP request E is received within the wait time WT, there is a very high probability that HTTP request E was transmitted over the Internet 80. Accordingly, there is a high probability that an external apparatus, which functions as a client, connected to the multifunction peripheral 200A over the Internet 80 can communicate with the multifunction peripheral 200A and, hence, there is great potential for security-related issues. Therefore, when there is great potential for security-related issues, the multifunction peripheral 200A according to the first embodiment can appropriately execute the process for enabling the password request function and for displaying the warning screen.

In a case where an HTTP request is not received in response to (or as a response to) the request transmission command within the wait time WT measured after HTTP request A was transmitted (S14 of FIG. 2), the CPU 210 according to the first embodiment does not execute processes to enable the password request function and to display the warning screen. Thus, the embodiment avoids performing unnecessary security-related processes when there is a high probability that the recommended configuration has been established and, thus, when there is low potential for security-related issues.

In the first embodiment described above, the multifunction peripheral 200A transmits HTTP request D that includes a unique ID to the server 300 (S44 of FIG. 4) and receives HTTP request E that includes the unique ID from the server 300 (S60 of FIG. 4). When the multifunction peripheral 200A receives HTTP request E that includes the unique ID, there is a very high probability that HTTP request E was transmitted over the Internet 80. Therefore, there is a high probability that an external apparatus, which functions as a client and is connected to the multifunction peripheral 200A over the Internet 80, can communicate with the multifunction peripheral 200A and, thus, there is great potential for security-related issues. Accordingly, when there is great potential for security-related issues, the multifunction peripheral 200A according to the first embodiment can execute suitable processes for enabling the password request function and for displaying a warning screen.

In the first embodiment described above, in a case where HTTP request E is received from the server 300, the security-related processes that the multifunction peripheral 200A executes include a process for switching the password request function from disabled to enabled (S68 of FIG. 4). Thus, the embodiment can improve the security of the multifunction peripheral 200A when an external apparatus, which functions as a client and is connected to the Internet 80, can communicate with the multifunction peripheral 200A.

According to the first embodiment described above, the multifunction peripheral 200A transmits HTTP request D and receives HTTP request E in conformance with HTTP. Hence, the web server function of the multifunction peripheral 200A provides a settings management service in conformance with HTTP. Thus, the multifunction peripheral 200A can suitably confirm whether an external apparatus, which functions as a client and is connected via the Internet 80, can communicate with the web server function of the multifunction peripheral 200A.

In the first embodiment described above, HTTP request D includes a designated URL (see FIG. 5(A)), and HTTP request E is transmitted with this designated URL as the destination URL (see FIG. 5(C)). Thus, the multifunction peripheral 200A can recognize HTTP request E transmitted from the server 300 to be an HTTP request for a settings confirmation process.

HTTP requests A and D are examples of a request. The designated URL is an example of the specific URL. Thus, HTTP requests A and D including the designated URL are examples of the request including the specific URL. The HTTP request E is an example of the specific data.

B. Second Embodiment

Figure 6:
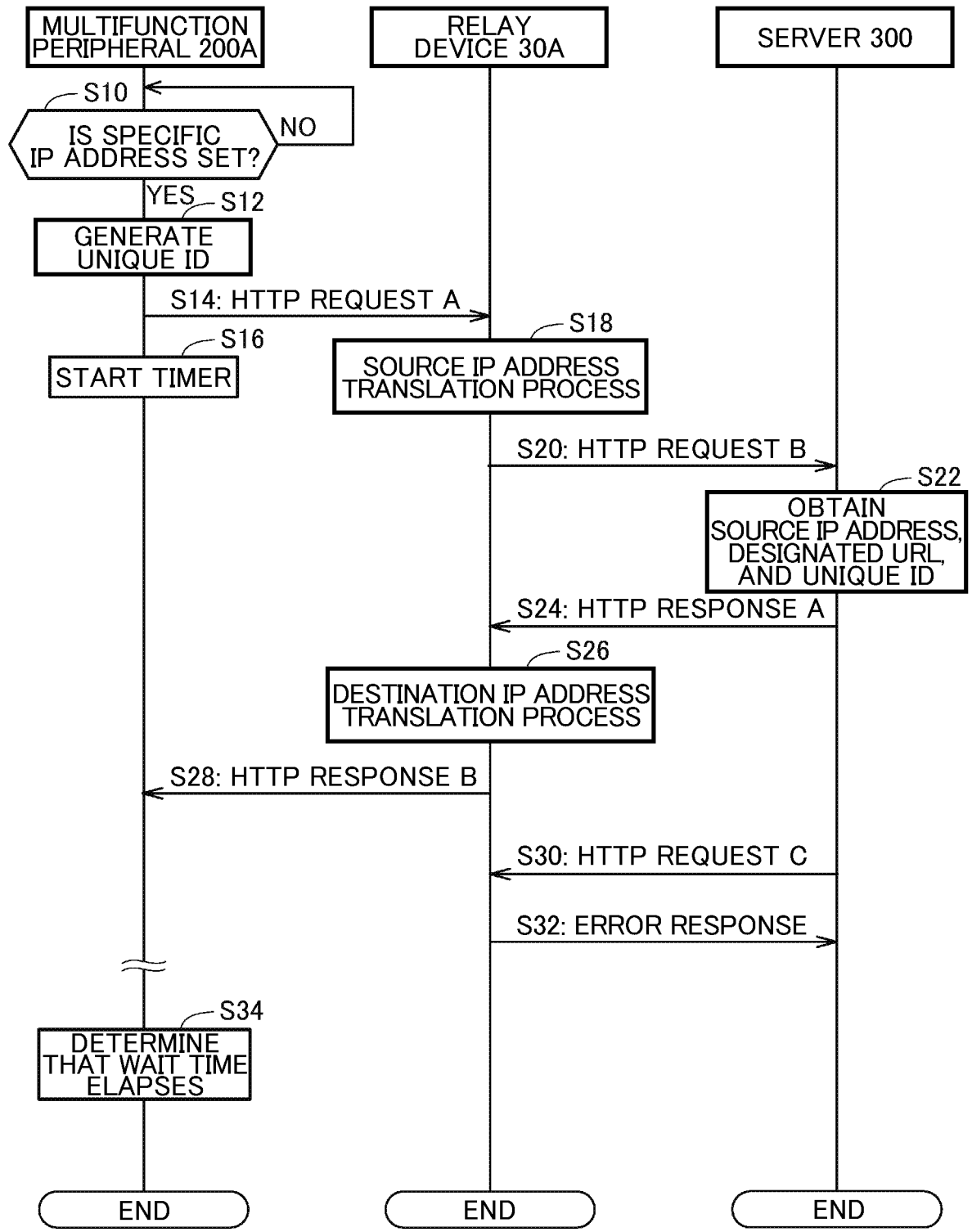
FIG. 6 is a first sequence diagram for a settings confirmation process according to the second embodiment.

In a second embodiment, the configuration of the system 1000 is the same as that shown in FIG. 1. However, a settings confirmation process according to the second embodiment is different from the first embodiment. Specifically, the settings confirmation process according to the first embodiment is started (or triggered) when the power to the multifunction peripheral 200A is turned on. In the second embodiment, the settings confirmation process is started (or triggered) at a different timing from that of the first embodiment. FIG. 6 is a first sequence diagram for the settings confirmation process according to the second embodiment. The first sequence diagram shows the sequence of steps when the recommended configuration is being used, as described above. FIG. 7 is a second sequence diagram for the settings confirmation process according to the second embodiment. The second sequence diagram shows the sequence of steps performed when a non-recommended configuration is being used.

As shown in FIGS. 6 and 7, the CPU 210 in the second embodiment continually monitors (S10 in FIGS. 6 and S40 in FIG. 7) the settings information database SI stored in the nonvolatile storage 230 while the power of the multifunction peripheral 200A is on in order to determine whether a transition from one state to another state has occurred. Here, the one state is a state where a special IP address is not set in the settings information database SI as the IP address setting of the multifunction peripheral 200A, and the another state is a state where a special IP address is set in the settings information database SI as the IP address setting of the multifunction peripheral 200A. Specifically, the CPU 210 determines that a transition has occurred in a case where a new IP address is set in the settings information database SI (or not stored in a storage) from a state where no IP address was set in the settings information database SI (or not stored in the storage). The CPU 210 also determines that a transition has occurred in a case where a second IP address is set in place of the first IP address after the first IP address was set in the settings information database SI (or not stored in the storage). The special IP address, the new IP address, and the second IP address are examples of the specific IP address.

In a case where the CPU 210 does not detect that a special IP address has been set (S10 of FIG. 6: NO or S40 of FIG. 7: NO), the CPU 210 does not start the settings confirmation process. In a case where the CPU 210 detects that a special IP address has been set (S10 of FIG. 6: YES or S40 of FIG. 7: YES), the CPU 210 starts the settings confirmation process and generates a unique ID (S12 of FIG. 6 or S42 of FIG. 7). The process from step S12 in FIG. 6 and the process from S42 in FIG. 7 is identical to the respective process from S12 in FIG. 2 and the process from S42 in FIG. 4 of the first embodiment. Accordingly, steps in FIGS. 6 and 7 for processes identical to steps in FIGS. 2 and 4 are designated with the same step numbers, and a description of these steps has been omitted.

As described above for the second embodiment, when there is potential for the multifunction peripheral 200A to have security issues, the multifunction peripheral 200A can recognize this potential by receiving HTTP request E from the server 300 operating (or functioning) as a client when the status of the IP address setting in the settings information database SI for the multifunction peripheral 200A changes from a state where a special IP address is not set to a state where a special IP address is newly set. Therefore, the multifunction peripheral 200A can properly execute processes for enabling the password request function and for displaying a warning screen.

It is possible that a non-recommended configuration could be established when the special IP address is set. That is, there is potential for an external apparatus, which functions as a client and is connected to the Internet 80, to become capable of communicating with the multifunction peripheral 200A when the special IP address is set. In the second embodiment, the multifunction peripheral 200A can execute a process for enabling the password request function and a process for displaying a warning screen at a suitable timing when such security issues may arise.

C. Variations of the First and Second Embodiments (1) In the second embodiment described above, the settings confirmation process begins when the CPU 210 detects a transition from a state where a special IP address is not set for the IP address setting of the multifunction peripheral 200A to a state where the special IP address is set for the IP address setting of the multifunction peripheral 200A. However, the settings confirmation process may be initiated when any of various transitions are detected. Other examples of transitions that start or trigger the start of the settings confirmation process will be described as variations with reference to FIGS. 8(A)-8(D).

FIGS. 8(A)-8(D) show explanatory diagrams illustrating variations of the first and second embodiments. Specifically, steps S10a-S10d and steps S40a-S40d may be executed in place of S10 in FIG. 6 and S40 in FIG. 7, respectively, described in the second embodiment.

Figure 8A:
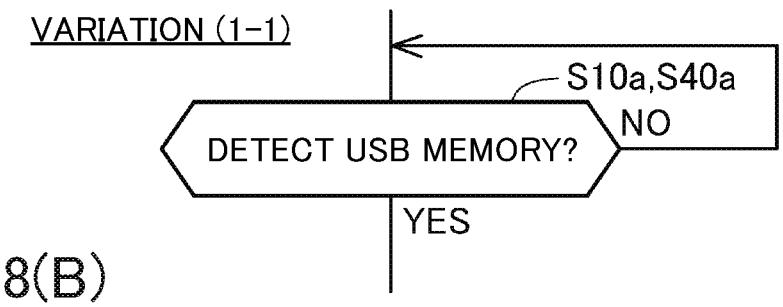

(1-1) In S10a and S40a of FIG. 8(A), the CPU 210 detects whether USB memory has been connected to the USB interface of the communication interface 270. The CPU 210 begins the settings confirmation process in a case where the CPU 210 detects that USB memory has been connected (S10a: YES or S40a: YES). The CPU 210 does not begin the settings confirmation process while not detecting that USB memory has been connected (S10a: NO or S40a: NO).

In this variation, the settings confirmation process may be started in a case where the CPU 210 detects the transition from a state in which an external storage device, which can be connected to the multifunction peripheral 200A without passing through the Internet 80, such as USB memory, is not connected to an interface (for example, the USB interface) included in the communication interface 270 to a state in which an external storage device is connected to the interface included in the communication interface 270. The settings confirmation process may not be started in a case where the CPU 210 does not detect the transition. In a case where the external storage device such as USB memory is connected to the multifunction peripheral 200A and an external apparatus, which functions as a client and is connected over the Internet 80, can communicate with the multifunction peripheral 200A, there is great potential for the external apparatus operated by a third party to access information stored on the external storage device. Hence, there is likely greater necessity to ensure security when the multifunction peripheral 200A is connected to another external storage device such as USB memory than when not connected to an external storage device.

Note that the settings confirmation process may be initiated in a case where the CPU 210 detects that removable memory other than USB memory, such as an SD Card or SmartMedia, or another external storage device, such as an external hard disk drive, is connected to the multifunction peripheral 200A.

Figure 8B:
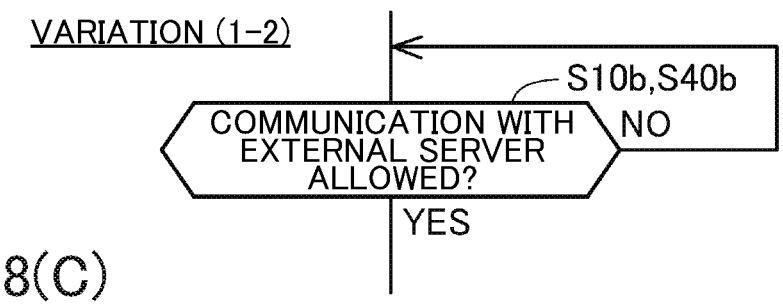

(1-2) In S10b and S40b of FIG. 8(B), the CPU 210 detects whether a setting to allow the multifunction peripheral 200A to communicate with an external storage server has transitioned from a state in which communication is not allowed to a state in which communication is allowed. As described above, an external storage server may be a destination for scan data, for example. The external storage server provides a storage service for saving data received from a client (the multifunction peripheral 200A or a personal computer not shown in the drawings), and a social network service for saving and publishing data received from a client, for example. Specific examples of well-known services provided by an external storage server as Evernote (registered trademark), Google Drive (registered trademark), SkyDrive (registered trademark), Dropbox (registered trademark), Flickr (registered trademark), and Facebook (registered trademark). Services provided by an external storage server may include services offered by the vendor of the multifunction peripheral 200A.

The CPU 210 begins the settings confirmation process in a case where the CPU 210 detects a change to a setting allowing communications with external storage servers, that is, in a case where the CPU 210 detects a transition from a state where the communication is not allowed to a state where the communication is allowed (S10b: YES or S40b: YES). The CPU 210 does not start the settings confirmation process as long as the setting for allowing communications with external storage servers has not changed, or, as long as the CPU 210 does not detects the transition (S10b: NO or S40b: NO).

While the multifunction peripheral 200A is allowed to communicate with external storage servers connected over the Internet 80, there is great potential for a third party to hack into the multifunction peripheral 200A and access information stored on these external storage servers in a state where the external apparatus of the third party, which functions as a client, can communicate with the multifunction peripheral 200A over the Internet 80. Thus, there is likely greater need to ensure security when the multifunction peripheral 200A is allowed to communicate with external storage servers than when not allowed to communicate with external storage servers.

Figure 8C:
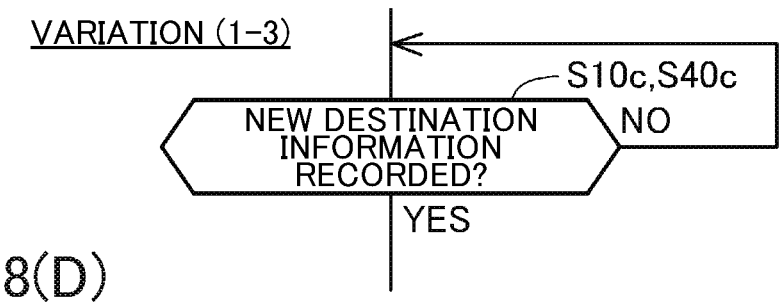

(1-3) In S10c and S40c of FIG. 8(C), the CPU 210 determines whether specific destination information (a new fax number or e-mail address, for example) has been recorded in the destination information database DI (see FIG. 1). The CPU 210 starts the settings confirmation process in a case where the CPU 210 detects that specific destination information is recorded, that is, in a case where the CPU 210 detects a transition from a state where the specific destination (address) information is not recorded in the destination information database DI (a storage) to a state where the specific destination (address) information is recorded in the destination information database DI (the storage) (S10c: YES or S40c: YES). The CPU 210 does not start the settings confirmation process while the recording of specific destination information has not been detected, that is, while the transition is not detected (S10c: NO or S40c: NO). The CPU 210 may start the settings confirmation process in a case where the CPU 210 detects a transition from a state where the specific address information is not stored in a storage (for example, the nonvolatile storage 230, or the destination information database DI) to a state where the specific address information is stored in the storage (S10c: YES or S40c: YES), and may not start the settings confirmation process in a case the transition is not detected (S10c: NO or S40c: NO). Specifically, the CPU 210 determines that a transition has occurred in a case where a new destination information is stored in the destination information database DI (a storage) from a state no destination information is stored in the destination information database DI (the storage). The CPU 210 also determines that a transition has occurred in a case where a second destination information is stored in place of a first destination information after the first destination information was stored in the destination information database DI (or a storage).

Since destination information is personal information, there is greater necessity to prevent disclosure of such information when a transition from no destination information being stored on the multifunction peripheral 200A to specific destination information being stored on the multifunction peripheral 200A is detected. Accordingly, the CPU 210 may start the settings confirmation process when such a transition is detected.

Figure 8D:
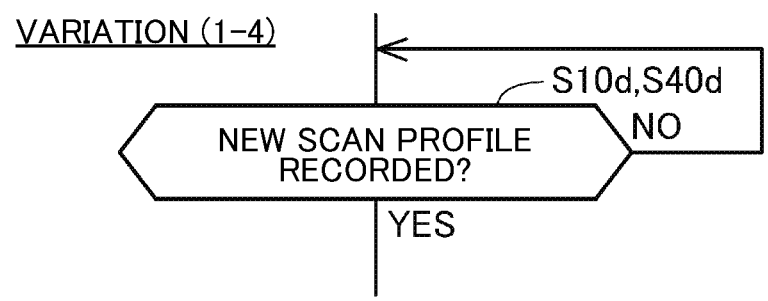

(1-4) In S10d and S40d of FIG. 8(D), the CPU 210 determines whether a new scan profile has been recorded in the settings information database SI. The CPU 210 begins the settings confirmation process in a case where registration of a new scan profile is detected, that is, in a case where the CPU 210 detects a transition from a state where specific scan profile is not recorded in the settings information database SI to a state where the specific scan profile is recorded in the settings information database SI (S10d: YES or S40d: YES). The CPU 210 does not begin the settings confirmation process while registration of a new scan profile has not been detected, that is, while the transition is not detected (S10d: NO or S40d: NO). The CPU 210 may begin the settings confirmation process in a case where the CPU 210 detects a transition from a state where specific settings information, which is related to the specific image process such as the scan process, the print process, or the facsimile process, is not recorded in a storage (for example, the nonvolatile storage 230, or the settings information database SI) to a state where the specific settings information is recorded in the storage (for example, the nonvolatile storage 230, or the settings information database SI). The CPU 210 may not begin the settings confirmation process in a case where the CPU 210 does not detect the transition. Specifically, the CPU 210 determines that a transition has occurred in a case where a new specific settings information is stored in the settings information database SI (a storage) from a state no specific settings information is stored in the settings information database SI (the storage). The CPU 210 also determines that a transition has occurred in a case where a second specific settings information is stored in place of a first specific settings information after the first specific settings information was stored in the settings information database SI (or a storage).

Since specific settings information is personal information, there is greater necessity to prevent disclosure of such information when a transition from a state where specific settings information is not stored on the multifunction peripheral 200A to a state where specific settings information is stored on the multifunction peripheral 200A is detected. Accordingly, the CPU 210 may begin the settings confirmation process in a case where such a transition is detected.

According to variations (1-1) through (1-4) described above, the CPU 210 can execute processes to enable the password request function and to display a warning screen at a suitable timing in which there is heightened need to ensure security.

Generally speaking, the multifunction peripheral 200A preferably begins the settings confirmation process in a case where a shift or a transition from a first state to a second state is detected. Here, the first state is a state where the multifunction peripheral 200A is inaccessible to specific information (for example, specific IP addresses, information stored in USB memory, information stored on external storage servers, specific destination information, and specific settings information), and the second state is a state where the multifunction peripheral 200A is accessible to the specific information, as described above.

(2) In the first and second embodiments described above, the first external apparatus that receives HTTP requests A and D from the multifunction peripheral 200A and the second external apparatus that transmits HTTP requests C and E are both the same device (the server 300 in the embodiments), but the first and second external apparatuses may be different devices. For example, the first external apparatus may transmit the source IP address, the designated URL, and the unique ID included in HTTP request A or D to the second external apparatus in a case where HTTP request A or D is received. In a case where the second external apparatus receives the source IP address, the designated URL, and the unique ID from the first external apparatus, the second external apparatus may transmit HTTP requests C and E over the Internet 80 by using the received information.

(3) In S68 and S70 of the first and second embodiments described above (see FIGS. 4 and 7), the CPU 210 executes a process for enabling the password request function to request a password as specific authentication information, and a process for displaying a warning screen as specific security-related processes, but the CPU 210 may execute other processes instead of or in addition to these processes. For example, the CPU 210 may transmit to the preregistered e-mail address of a user e-mail that includes a message similar to the message displayed in the warning screen. Alternatively, the CPU 210 may control the printer 290 to print this message. The CPU 210 may also halt usage of specific protocols on the multifunction peripheral 200A. Specific protocols may include HTTP, Internet Printing Protocol (IPP), and File Transfer Protocol (FTP), for example. Halting the usage of such specific protocols may be implemented by discarding each request received in a case where the request specifying the destination port number to be a port number corresponding to services provided using the specific protocols is received. Services provided using the specific protocols may include the web services providing the settings management service described in the embodiments.

(4) In the first and second embodiments, HTTP requests A and D transmitted from the multifunction peripheral 200A and HTTP requests C and E transmitted from the server 300 in the first and second embodiment may conform to another protocol, such as FTP. Whatever protocol is used should be a protocol that allows the transmission of requests, with one of the multifunction peripheral 200A and server 300 serving as the client and the other as the server.

(5) While the multifunction peripherals 200A and 200B serve as the communication apparatuses in the first and second embodiments described above, image processing apparatuses such as a standalone scanner, a printer, or a digital camera may be applied as communication apparatuses. Other types of communication apparatuses may be used in place of image processing apparatuses, such as storage devices or personal computers.

(6) The detailed steps in the settings confirmation process described in the embodiments are mere examples and may be modified in various ways. For example, in the first and second embodiments, the unique ID may be omitted from HTTP requests A and D transmitted from the multifunction peripheral 200A. In this case, the CPU 210 may execute special security-related processes in a case where an HTTP request is received within the wait time WT from a count started timing which is a timing immediately after the transmission of HTTP request A or D, even when the HTTP request does not include a unique ID.

Further, in a case where an HTTP request includes a unique ID is received after the wait time WT has elapsed following transmission of HTTP requests A and D from the multifunction peripheral 200A in the first and second embodiments, the CPU 210 may execute the special security-related processes. In this case, steps related to the wait time WT may be omitted.

The designated URL may also be omitted from HTTP requests A and D transmitted from the multifunction peripheral 200A. In this case, the server 300 transmits HTTP requests C and E to a preset destination URL.

D. Third Embodiment

D-1: Structure of a System 2000

A third embodiment will be described while referring to FIGS. 9-17, wherein like parts and components are designated with the same reference numerals to avoid duplicating description. A system 2000 includes the multifunction peripheral 200A, the terminal devices 10A-10C, the server 300, the relay devices 30A, and 30B, and a relay device 30C. The relay devices 30A-30C constitute an internal network IN that includes two local area networks LN11 and LN12. The internal network IN is a network constructed in a single institution, such as a company network or a school network.

More specifically, the multifunction peripheral 200A and the terminal device 10A are connected to the local area network LN11. The local area network LN11 is connected to the relay device 30C through the relay device 30A. The terminal devices 10B and 10C are connected to the local area network LN12. The local area network LN12 is connected to the relay device 30C through the relay device 30B. The relay device 30C is connected to both the relay device 30A and the relay device 30B. These connections within the internal network IN are achieved with Ethernet lines (Ethernet is a registered trademark), for example.

The relay device 30C is connected to the Internet 80 through an Internet service provider (not shown). Hence, devices on the internal network IN can communicate with devices on the Internet 80 through the relay device 30C.

In the third embodiment, apparatuses on the local area network LN11 to which the multifunction peripheral 200A belongs, such as the terminal device 10A, will be called "internal apparatuses," while apparatuses on networks other than the local area network LN11 to which the multifunction peripheral 200A belongs, and specifically the terminal devices 10B and 10C, the server 300, and a third party computer 400 (the computer belonging to a malicious hacker, for example) connected to the Internet 80 will be called "external apparatuses." External apparatuses are apparatuses that communicate with the multifunction peripheral 200A through the relay device 30A functioning as a gateway to the local area network LN11.

Among these external apparatuses, apparatuses on the internal network IN to which the multifunction peripheral 200A belongs, and specifically the terminal devices 10B and 10C on the local area network LN12, will be called a first type of external apparatuses (or external apparatuses of the first type). Further, among the external apparatuses, apparatuses not on the internal network IN, i.e., apparatuses that connect to the multifunction peripheral 200A over the Internet 80, and specifically the server 300 and a third party computer 400, will be called a second type of external apparatuses (or external apparatuses of the second type).

In the third embodiment, a function of the web server is to provide clients with the settings management service for allowing the clients to acquire or modify settings information that is related to the multifunction peripheral 200A and stored in the settings information database SI.

It will be assumed that the web server function of the multifunction peripheral 200A is intended to provide services to clients that include the first type of external apparatuses and internal apparatuses on the internal network IN, and specifically, the terminal device 10A on the local area network LN11 (internal apparatus) and the terminal devices 10B and 10C on the local area network LN12 (external apparatuses of the first type). The web server function of the multifunction peripheral 200A is not intended for providing services to the second type of external apparatuses via the Internet 80. Therefore, from a security standpoint it is preferable that the second type of external apparatuses cannot transmit HTTP requests to the multifunction peripheral 200A over the Internet 80.

In the third embodiment, the communication interface 270 includes an interface for connecting to the local area network LN11, and specifically a wired or wireless interface conforming to Ethernet (registered trademark) and Wi-Fi specifications.

In the third embodiment, by executing the server program PG2, the CPU 310 executes a settings confirmation process described later in conjunction with the multifunction peripheral 200A.

The terminal devices 10A-10C can communicate with the multifunction peripheral 200A through the internal network IN in order to use the functions of the multifunction peripheral 200A. For example, the terminal devices 10A-10C can transmit a print job to the multifunction peripheral 200A so as to instruct the multifunction peripheral 200A to perform printing. The terminal device 10A-10C may also communicate with the web server function of the multifunction peripheral 200A to modify or acquire settings information for the same.

As explained in the first embodiment, the relay device 30A can function as the hub, and the router. In the third embodiment, the hub function relays communications between devices on the local area network LN11, such as communications between the terminal device 10A and the multifunction peripheral 200A. The router function relays communications between devices on the local area network LN11 and devices on another network which is connected to the relay device 30C, such as the Internet 80. In the third embodiment, the relay device 30A does not function as the data circuit terminating device.

As with the relay device 30A, the relay device 30B functions as a hub to relay communications between each of apparatuses on the local area network LN12, and functions as a router to relay communications between devices on the local area network LN12 and apparatuses on another network. In the third embodiment, the relay device 30B does not function as the data circuit terminating device.

The relay device 30C is capable of functioning as a router and a data circuit-terminating device. The relay device 30C functions as a router for relaying communications between the relay devices 30A and 30B and for relaying communications between each of the relay devices 30A and 30B and devices on the Internet 80. The relay device 30C functions as a data circuit-terminating device by modifying signals used on the internal network IN (and specifically, Ethernet signals), and signals used in communications between the relay device 30C and the Internet service provider, such as optical and ADSL signals. The data circuit-terminating device may be an Optical Network Unit (ONU) in the case of an optical line, and a modem in the case of an ADSL line.

The router and data circuit-terminating functions of the relay device 30C may be all implemented by a single device, as in the third embodiment, or by two separate devices. The same implementations are also possible for the hub and router functions of the relay devices 30A and 30B.

D-2: Network Configuration

The apparatuses 200A, 10A-10C, and 30A-30C on the internal network IN are all assigned different local IP addresses (also called "private IP addresses") for communicating with each other within the internal network IN. In the third embodiment, "LIP_M" will be the local IP address assigned to the multifunction peripheral 200A, and "LIP_Ta" and "LIP_Tb" will be the local IP addresses assigned to the terminal devices 10A and 10B, respectively.

A global IP address "GIP_R" is assigned to the relay device 30C connected to the Internet 80. A global IP address is a unique address that is not duplicated among apparatuses on the Internet 80 and allows the relay device 30C to perform communications over the Internet 80. A global IP address "GIP_S" is assigned to the server 300 which is used in an example of receiving an HTTP request from the multifunction peripheral 200A in a settings confirmation process described later.

The relay device 30C implements a function for modifying address information called Network Address Translation (NAT) and Network Address Port Translation (NAPT) in order to connect to the Internet 80, in part of its functions as a router. In the address modifying function, the relay device 30C executes a source IP address translation process when relaying a request from the internal network IN to the Internet 80, and a destination IP address translation process when relaying a response from the Internet 80 to the internal network IN. As an example, the multifunction peripheral 200A may transmit a request (an HTTP request, for example) to an external apparatus of the second type on the Internet 80, or may receive a response to this request (an HTTP response, for example) from an external apparatus of the second type. When relaying a request from the multifunction peripheral 200A to an external apparatus of the second type, the relay device 30C converts the source IP address of the request from the local IP address "LIP_M" of the multifunction peripheral 200A to the global IP address "GIP_R" of the relay device 30C (the source IP address translation process). At this time, the relay device 30C records modification history for the IP address. When relaying a response from an external apparatus of the second type to the multifunction peripheral 200A, the relay device 30C references the recorded modification history and changes the destination IP address of the response from the global IP address "GIP_R" of the relay device 30C to the local IP address "LIP_M" of the multifunction peripheral 200A (destination IP address translation process). The relay device 30C deletes the modification history referenced in this process after the response has been relayed.

In the third embodiment, the relay devices 10A and 10B do not implement the function for modifying address information or the address modifying function.

The relay device 30C also implements a port forwarding function as another of its router functions when the port forwarding function is enabled. The relay device 30C implements the port forwarding function by referencing the port forwarding configuration table FT (see FIG. 9).

FIG. 10 shows an example of a port forwarding configuration table FT. The port forwarding configuration table FT stores correlations that associate a target destination IP address, a target port number, a forwarding destination IP address with each other. In a case where the relay device 30C receives a request (an HTTP request, for example) from an external apparatus of the second type via the Internet 80 while the port forwarding function is enabled, the relay device 30C extracts the destination IP address and destination port number from this request. The relay device 30C determines whether the destination IP address of the request matches a target IP address set in the port forwarding configuration table FT and whether the destination port number matches the target port number set in the port forwarding configuration table FT in association with the target IP address. In a case where the destination IP address matches a target IP address and the destination port number matches the corresponding target port number in association with the target IP address, the relay device 30C converts the destination IP address in the request to the forwarding destination IP address in the port forwarding configuration table FT associated with the target port number. Next, the relay device 30C forwards this converted request by routing the request to the forwarding destination IP address. As a result, the request is transmitted to an apparatus that has been assigned with the forwarding destination IP address. Using the example in FIG. 10, in a case where a request having "GIP_R" as the destination IP address and a specific port number PNweb as the destination port number is transmitted to the relay device 30C via the Internet 80, the relay device 30C relays this request to the multifunction peripheral 200A assigned with the local IP address "LIP_M". In the third embodiment, the specific port number PNweb is a port number that specifies the settings management service implemented by the web server function of the multifunction peripheral 200A. Accordingly, the multifunction peripheral 200A receives this request as a request for the settings management service.

In the third embodiment, a recommended configuration of the system 2000 is a configuration in which the address modifying function described above is enabled and in which the port forwarding function is disabled. Here, the port forwarding function is set such that requests whose destination port number is the specific port number PNweb, as in the port forwarding configuration table FT of FIG. 10, are to be transmitted to the multifunction peripheral 200A. Hereinafter, this port forwarding function will be called the specific port forwarding function.

Under the recommended configuration of the system 2000, data cannot be transmitted from an external apparatus of the second type to the multifunction peripheral 200A in general unless a request is first transmitted from the multifunction peripheral 200A to the external apparatus of the second type and the modification history of the IP address of the multifunction peripheral 200A is recorded on the relay device 30C. Therefore, it is possible to transmit a request from the multifunction peripheral 200A side to an external apparatus of the second type initially while the multifunction peripheral 200A functions as the client and the external apparatus of the second type functions as the server. However, it is not possible to transmit a request from the external apparatus of the second type to the multifunction peripheral 200A initially while the multifunction peripheral 200A functions as the server and the external apparatus of the second type functions as the client. Thus, under the recommended configuration, an external apparatus of the second type (for example the computer 400 shown in FIG. 9) belonging to a third party (a malicious hacker, for example) will have difficulty communicating with the multifunction peripheral 200A, even when knowing the global IP address "GIP_R" of the relay device 30C and the specific port number PNweb.

In some cases, network settings of the system 2000 other than the recommended configuration (a "non-recommended configuration" of the third embodiment) may be used. In the third embodiment, a non-recommended configuration is a configuration in which both the address modifying function and the specific port forwarding function described above are enabled. In a case where an external apparatus of the second type recognizes the global IP address "GIP_R" and the specific port number PNweb, under a non-recommended configuration, the external apparatus of the second type can initiate transmission of a request to the multifunction peripheral 200A, with the multifunction peripheral 200A functioning as a server and the external apparatus of the second type as a client. Accordingly, the external apparatus of a third party can more easily communicate with the multifunction peripheral 200A under a non-recommended configuration than under the recommended configuration. As a result, there is greater potential for a third party using the settings management service provided by the multifunction peripheral 200A to tamper with settings information in the settings information database SI or to gain access to destination information in the destination information database DI, for example. Hence, the security level under a non-recommended configuration is lower than that under the recommended configuration and may give rise to security issues. Such a non-recommended configuration might be employed when the administrator of the multifunction peripheral 200A has insufficient knowledge of security issues, for example.

D-3: Operations of the System 1000

In the third embodiment, a settings confirmation process is performed to determine whether the recommended configuration has been established or whether a non-recommended configuration is being used. This settings confirmation process is executed by the CPU 210 of the multifunction peripheral 200A and the CPU 310 of the server 300. This settings confirmation process is executed in a case where the multifunction peripheral 200A receives HTTP request A1 with the specific port number PNweb as the destination port number, i.e., in a case where the multifunction peripheral 200A receives HTTP request A1 which is transmitted to the web server function of the multifunction peripheral 200A. HTTP request A1 is transmitted to the multifunction peripheral 200A while the source device of the request functions as the client, and the multifunction peripheral 200A functions as the server.

Figure 11:
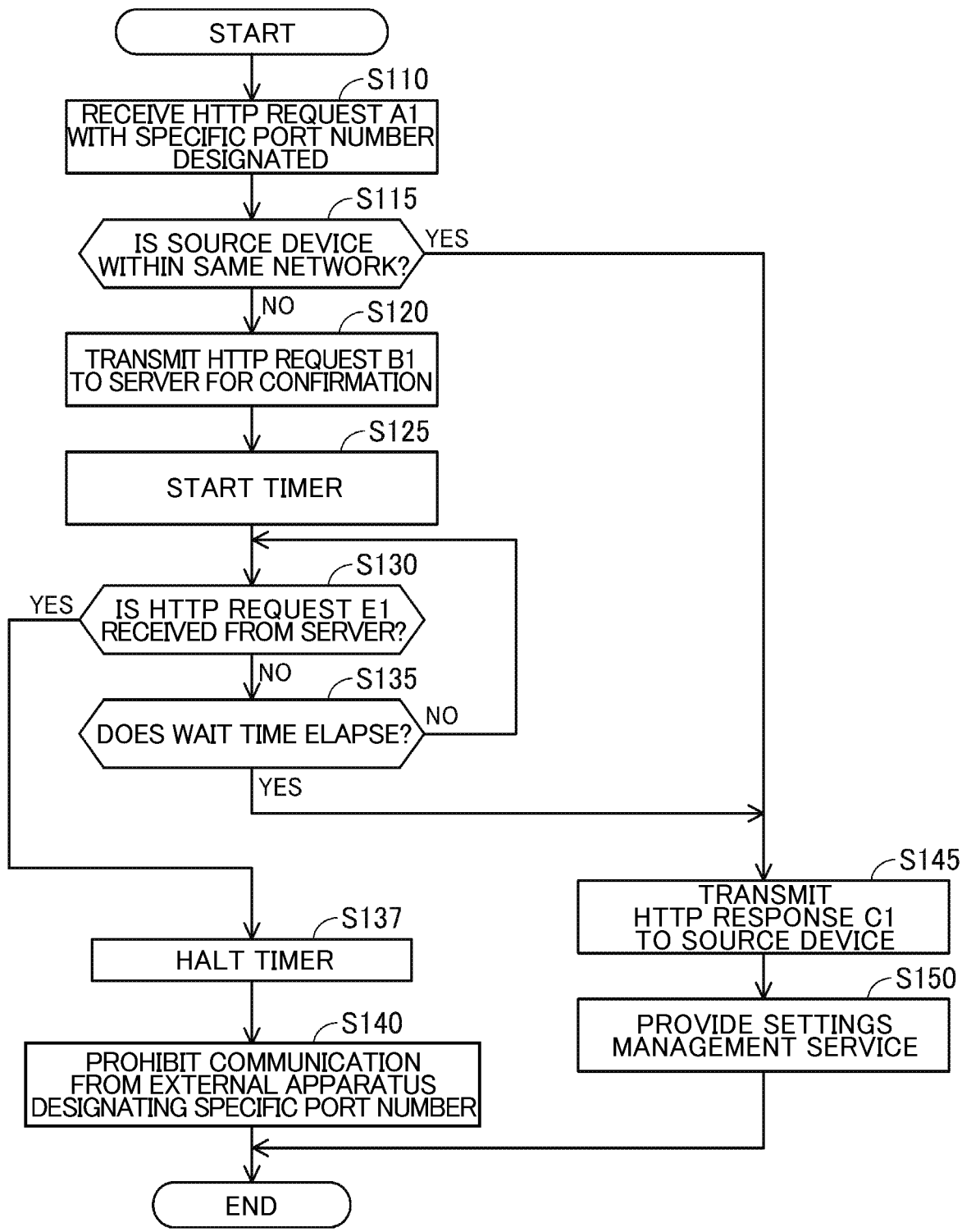
FIG. 11 is a flowchart illustrating a settings confirmation process according to the third embodiment.

FIG. 11 is a flowchart illustrating steps in the settings confirmation process according to the third embodiment. This flowchart shows only the part of the settings confirmation process executed by the multifunction peripheral 200A. In S110 of FIG. 11, the CPU 210 of the multifunction peripheral 200A receives HTTP request A1 with the specific port number PNweb being designated. In S115 the CPU 210 determines whether the source device of HTTP request A1 is a device within the same network, i.e., an internal apparatus. Specifically, the CPU 210 identifies the network address of the local area network LN11 to which the multifunction peripheral 200A belongs on the basis of a subnet mask and the IP address "LIP_M" assigned to the multifunction peripheral 200A. Next, the CPU 210 identifies the network address of the network to which the source device of HTTP request A1 belongs on the basis of the subnet mask and the source IP address in HTTP request A1, and compares this network address to the network address of the local area network LN11. In a case where the network address of the network to which the source device of HTTP request A1 belongs matches the network address of the local area network LN11, the CPU 210 determines that the source device of HTTP request A1 is an internal apparatus in the same network. As described above, an internal apparatus is a device on the local area network LN11 (the terminal device 10A, for example). In a case where the network addresses do not match, the CPU 210 determines that the source device of HTTP request A1 is an external apparatus. As described above, an external apparatus is either an external apparatus of the first type on the local area network LN12 (the terminal devices 10B and 10C, for example) or an external apparatus of the second type connected to the multifunction peripheral 200A via the Internet 80 (the third party computer 400, for example). Here, the step for determining whether the source device of HTTP request A1 is a device on the same network may be treated as a step for determining whether HTTP request A1 is received via the gateway which is operated by the relay device 30A for the local area network LN11, or HTTP request A1 is received without passing through the gateway.

In a case where the source device of HTTP request A1 is not a device on the same network (S115: NO), i.e., in a case where the source device of HTTP request A1 is an external apparatus, then the source device of HTTP request A1 may be an external apparatus of the second type not intended as a client of the settings management service. Accordingly, the CPU 210 executes steps S120-S135 in this case in order to confirm whether the settings are the recommended configuration or a non-recommended configuration. In a case where the source device of HTTP request A1 is on the same network, i.e., is an internal apparatus (S115: YES), the CPU 210 skips steps S120-S135 and advances to step S145 since the source device of HTTP request A1 cannot be an external apparatus of the second type.

In S120 the CPU 210 transmits HTTP request B1 to the server 300 for confirmation. In S125 the CPU 210 starts a timer to count a prescribed wait time WT. The wait time WT is a period of a few seconds, for example.

In S130 the CPU 210 determines whether HTTP request E1 has been received from the server 300 in response to (or as a response to) HTTP request B1. In a case where HTTP request E1 is not received (S130: NO), in S135 the CPU 210 determines whether the prescribed wait time WT has elapsed from a timing of S125 (which is a timing immediately after HTTP request B is transmitted). In a case where the wait time WT has not elapsed from a timing of S125 (S135: NO), the CPU 210 returns to S130 and waits to receive HTTP request E1 from the server 300. Note that transmission of HTTP request E1 is performed with the server 300 serving (or functioning) as the client in conformance with HTTP and the multifunction peripheral 200A serving (or functioning) as the server in conformance with HTTP. Thus, the CPU 210 determines whether an HTTP request received within the prescribed wait time WT from a timing of S125 is HTTP request E1 transmitted from the server 300 by determining whether the source IP address of this HTTP request is the global IP address "GIP_S" of the server 300, for example.

In a case where HTTP request E1 is received (S130: YES), the CPU 210 can confirm that an external apparatus of the second type can transmit a request to the multifunction peripheral 200A as a client over the Internet 80. In other words, the CPU 210 can confirm that a non-recommended configuration has been set. In this case, the CPU 210 halts the timer in S137, prohibits communication from external apparatuses to the specific port number PNweb in S140, and ends the settings confirmation process. In other words, the CPU 210 changes settings to establish a state in which external apparatuses such as the terminal device 10B and the third party computer 400 cannot use the port corresponding to the specific port number PNweb. That is, the CPU 210 closes the port corresponding to the specific port number PNweb. Thereafter, the CPU 210 provides the settings management service to internal apparatuses (the terminal device 10A, for example) in a case where an HTTP request, which is transmitted to the specific port number PNweb, is received from the internal apparatus, but does not provide the settings management service to external apparatuses (the terminal device 10B or the third party computer 400, for example) in a case where an HTTP request, which is transmitted to the specific port number PNweb, is received from the external apparatus. As a result, the multifunction peripheral 200A cannot provide the settings management service to external apparatuses of the first type (terminal device 10B, for example) originally intended to be clients of the settings management service, but can reduce the potential for external apparatuses of the second type (the third party computer 400, for example) not intended as clients to use the settings management service.

In a case where the prescribed wait time WT elapses from a timing of S125 before HTTP request E1 is received (S135: YES), the CPU 210 advances to S145. In this case, the CPU 210 can confirm that the external apparatus of the second type as a client cannot transmit a request to the multifunction peripheral 200A via the Internet 80, i.e., that the recommended configuration has been set. Thus, it is likely that the source device of HTTP request A1 is an external apparatus of the first type (the terminal device 10B, for example) intended as a client of the settings management service. Accordingly, the CPU 210 advances to step S145 without performing S140 described above.

In S145 the CPU 210 transmits HTTP response C1 to the source device of HTTP request A1 as a response to HTTP request A1. In S150 the CPU 210 as a web server performs communications with the source device of HTTP request A1 and provides the settings management service to the source device of HTTP request A1.

D-3-1: Operations Performed When an HTTP Request is Received from an External Apparatus (Under the Recommended Configuration)

Next, the settings confirmation process outlined with reference to FIG. 11 will be described in greater detail. FIG. 12 is a first sequence diagram for the settings confirmation process of the third embodiment. The first sequence diagram shows the sequence of steps performed in a case where an external apparatus transmits HTTP request A1 to the multifunction peripheral 200A while the network settings have been set to the recommended configuration described above. In this sequence diagram, the settings confirmation process described above is executed in response to the multifunction peripheral 200A receiving HTTP request A1 transmitted from the terminal device 10B serving as the external apparatus. FIGS. 13(A)-13(H) are explanatory diagrams showing examples of requests and responses used during the settings confirmation process.

In S312 of FIG. 12, the terminal device 10B transmits HTTP request A1 to the multifunction peripheral 200A. As shown in FIG. 13(A), the source IP address included in the IP header of HTTP request A1 is the local IP address "LIP_Tb" of the terminal device 10B, and the destination IP address is the local IP address "LIP_M" of the multifunction peripheral 200A. Further, the destination port number included in the TCP header of HTTP request A1 is the specific port number PNweb. The multifunction peripheral 200A receives this HTTP request A1 through normal routing.

In a case where HTTP request A1 is received (S110 of FIG. 11), in S314 of FIG. 12 (S115 of FIG. 3) the CPU 210 determines that the source device of HTTP request A1 is not in the same network since the source device of HTTP request A1 in the example of FIG. 12 is the terminal device 10B. The CPU 210 makes this determination based on the local IP address "LIP_Tb" of the terminal device 10B. As a result, the CPU 210 transmits HTTP request B1 in S316 of FIG. 12 (S120 of FIG. 11). As shown in FIG. 13(B), the source IP address included in the IP header of HTTP request B1 is the local IP address "LIP_M" of the multifunction peripheral 200A, and the destination IP address is the global IP address "GIP_S" of the server 300. Further, the HTTP body of HTTP request B1 includes the destination port number of HTTP request A1 (the specific port number PNweb in the example of FIG. 13(A)) as the designated port number. HTTP request B1 additionally includes a request transmission command. The request transmission command is a command to the server 300 to transmit an HTTP request to the multifunction peripheral 200A. The request transmission command may be included in the body of HTTP request B1 or may be included in the destination URL of the HTTP header as a special URL denoting the request transmission command. The relay device 30C receives HTTP request B1 via the relay device 30A through routing.

After transmitting HTTP request B1 in S316, in S317 the CPU 210 starts a timer for counting the prescribed wait time WT. The wait time WT may be a period of a few seconds, for example.

The relay device 30C implements the address modifying function. Hence, in a case where the relay device 30C receives HTTP request B1, in S318 the relay device 30C executes the source IP address translation process described above to convert HTTP request B1 into HTTP request C1 (FIG. 13(C)). Hence, the source IP address in the IP header of HTTP request B1 is converted to the global IP address "GIP_R" of the relay device 30C. The relay device 30C stores this modification record of the IP address therein, as a record of the IP modification and as the modification history.

In S320 the relay device 30C transmits over the Internet 80 HTTP request C1 (see FIG. 13(C)) obtained by converting the source IP address of HTTP request B1. The server 300 receives HTTP request C1 via the Internet 80.

In S322 the CPU 310 of the server 300 extracts (or obtains) the source IP address included in the IP header of HTTP request C1 received from the relay device 30C and the designated port number included in the HTTP body. In the example of FIG. 13(C), the CPU 310 extracts (or obtains) the global IP address "GIP_R" of the relay device 30C as the source IP address and the specific port number PNweb as the designated port number.

In S324 the CPU 310 transmits HTTP response A1 (see FIG. 13(D)) over the Internet 80 as a response to HTTP request C1. The source IP address included in the IP header of HTTP response A1 is the global IP address "GIP_S" of the server 300. The destination IP address included in the IP header of the HTTP response A11 is the global IP address extracted in S322, i.e., the global IP address "GIP_R" of the relay device 30C. The relay device 30C receives HTTP response A1 via the Internet 80.

In a case where the relay device 30C receives HTTP response A1, in S326 the relay device 30C executes the destination IP address translation process described above. That is, the relay device 30A converts HTTP response A1 into HTTP response B1 shown in FIG. 13(E). Specifically, the relay device 30C references the modification record of the source IP address translation process recorded in S318 and modifies the destination IP address in the IP header of HTTP response A1 to the local IP address "LIP_M" of the multifunction peripheral 200A on the basis of the referenced modification record. The relay device 30C subsequently deletes the modification record referenced in S326.

In S328 the relay device 30C transmits HTTP response B1 (see FIG. 13(E)) obtained by changing the destination IP address in HTTP request A1 to the modified destination IP address "LIP_M". The multifunction peripheral 200A receives HTTP response B1 via the relay device 30A and the local area network LN11.

The transmission and reception of HTTP requests A1 and B1 in S316 and S320, and the transmission and reception of HTTP responses A1 and B1 in S324 and S328, are communications in which the multifunction peripheral 200A functions as the client in conformance with HTTP and the server 300 functions as the server in conformance with HTTP.

In S330 the CPU 310 of the server 300 transmits HTTP request D1 (see FIG. 13(F)) over the Internet 80 in response to (or as a response to) the request transmission command included in HTTP request C1 (see FIG. 13(C)). The source IP address in the IP header of HTTP request D1 is the global IP address "GIP_S" of the server 300 obtained in S322. The destination IP address included in the IP header of HTTP request D1 is the global IP address obtained in S322, i.e., the global IP address "GIP_R" of the relay device 30C. Consequently, the relay device 30C receives HTTP request D1. The destination port number included in the TCP header of HTTP request D1 is the specific port number PNweb obtained in S322.

The transmission of HTTP request D1 in S330 is communications in which the multifunction peripheral 200A functions as the server and the server 300 functions as the client. In this way, the multifunction peripheral 200A and the server 300 can operate (or function) both as clients and servers in conformance with HTTP.

In a case where HTTP request D1 is received, the relay device 30C recognizes that the destination IP address is set to the relay device 30C, but has no modification record from a corresponding source IP address translation process. Accordingly, the relay device 30C does not perform the destination IP address translation process. Further, since the specific port forwarding function is disabled under the recommended configuration, the relay device 30C does not perform a port forwarding process even when the destination port number in HTTP request D1 is the specific port number PNweb. Therefore, the relay device 30C discards HTTP request D1 rather than relaying the same.

In S332 the relay device 30C transmits an error response (see FIG. 13(G)) over the Internet 80. The error response includes error information indicating that the destination of HTTP request D1 is incorrect. As shown in FIG. 13(G), the source IP address in the error response is the global IP address "GIP_R" of the relay device 30C, while the destination IP address is the global IP address "GIP_S" of the server 300. Accordingly, the server 300 receives this error response.

As described above, HTTP request D1, which is transmitted from the server 300 in response to (or as a response to) the request transmission command included in HTTP request B1 transmitted from the multifunction peripheral 200A, does not reach the multifunction peripheral 200A when the recommended configuration has been established. That is, when using the recommended configuration, an HTTP request does not reach the multifunction peripheral 200A in communications performed with the multifunction peripheral 200A functioning as the server and the server 300 functioning as the client. Consequently, the wait time WT elapses without the multifunction peripheral 200A receiving HTTP request D1.

Once the wait time WT elapses from a timing of S317 which is a timing immediately after HTTP request B1 is transmitted, the CPU 210 of the multifunction peripheral 200A determines in S334 of FIG. 12 that the wait time WT has elapsed from a timing of S317 based on the timer started in S317, as illustrated in S125 and S135 of FIG. 11. At this time, the CPU 210 can determine that the current network configuration is the recommended configuration and that the specific port forwarding function is disabled. Therefore, since it can be determined that there are no security-related issues, in S336 the CPU 210 transmits HTTP response C1 to the terminal device 10A in response to (or as a response to) HTTP request A1 received from the terminal device 10B, and in S338 provides the settings management service to the terminal device 10B, as described in S145 and S150 of FIG. 11.

D-3-2: Operations Performed When an External Apparatus Transmits an HTTP Request (Under a Non-Recommended Configuration)

FIG. 14 is a second sequence diagram for the settings confirmation process of the third embodiment. The second sequence diagram shows the sequence of steps performed in a case where an external apparatus transmits HTTP request A1 to the multifunction peripheral 200A while the network settings have been set to a non-recommended configuration. In this sequence diagram, the settings confirmation process described above is executed in response to the multifunction peripheral 200A receiving HTTP request A1 transmitted from the terminal device 10B serving as the external apparatus.

The process in S312-S330 of FIG. 14 is identical to the process in S312-S330 of FIG. 12. Under a non-recommended configuration, the specific port forwarding function is enabled on the relay device 30C. Accordingly, in S332B the relay device 30C executes a port forwarding process in a case where HTTP request D1 transmitted from the server 300 is received in S330 of FIG. 14. More specifically, the relay device 30C recognizes that the destination IP address of HTTP request D1 is the global IP address "GIP_R" of the relay device 30C itself and that the destination port number is the specific port number PNweb, which is the target port number set in the port forwarding configuration table FT. Consequently, the relay device 30C converts the destination IP address of HTTP request D1 to the local IP address "LIP_M" of the multifunction peripheral 200A correlated with the specific port number PNweb in the port forwarding configuration table FT as the forwarding destination IP address. The converted HTTP request is HTTP request E1 shown in FIG. 13(H). The source IP address in the IP header of HTTP request E1 is the global IP address "GIP_S" of the server 300. The destination IP address included in the IP header of HTTP request E1 is the local IP address "LIP_M" which is converted by the relay device 30C. The destination port number included in the TCP header of HTTP request D1 is the specific port number PNweb.

Consequently, as described in FIG. 11 (S130 of FIG. 11: YES, S137, S140), the CPU 210 of the multifunction peripheral 200A halts the timer in S336B of FIG. 14 in a case where the CPU 210 receives HTTP request E1, and in S338B prohibits communications from the external apparatus to specific port number PNweb.

D-3-3: Operations Performed When an Internal Apparatus Transmits an HTTP Request FIG. 15 is a third sequence diagram for the settings confirmation process of the third embodiment. In this sequence diagram, the settings confirmation process described above is executed in response to the multifunction peripheral 200A receiving HTTP request A1 transmitted from the terminal device 10A, which is an internal apparatus. In this case, the same process is performed irrespective of whether the network configuration is set to the recommended configuration or a non-recommended configuration.

More specifically, in S312 of FIG. 15 the terminal device 10A transmits HTTP request A1 to the multifunction peripheral 200A. However, in this case the source IP address of HTTP request A1 is the local IP address "LIP_Ta" (not shown) of the terminal device 10A and not the local IP address "LIP_Tb" of the terminal device 10B.

In a case where HTTP request A1 is received (S110 of FIG. 11), in S314C of FIG. 15 (S115 of FIG. 11) the CPU 210 determines that the source device of HTTP request A1 is within the same network since the source device is the terminal device 10A. The CPU 210 makes this determination based on the local IP address "LIP_Ta" of the terminal device 10A in HTTP request A1. Since the source device of HTTP request A1 in this case is an internal apparatus and has no possibility of being an external apparatus of the second type, the CPU 210 does not perform steps S120-S135 of FIG. 11. Accordingly, as described in S145 and S150 of FIG. 11, the CPU 210 transmits HTTP response C1 to the terminal device 10A in S336C of FIG. 15 in response to (or as a response to) HTTP request A1 received from the terminal device 10A and provides the settings management service to the terminal device 10B in S338C of FIG. 15.

According to the third embodiment described above, in a case where the multifunction peripheral 200A receives (S312 of FIG. 14) HTTP request A1 (see FIG. 13(A)) from an external apparatus (the terminal device 10B, for example), the multifunction peripheral 200A transmits (S316 of FIG. 14) HTTP request B1 (see FIG. 13(B)) to the server 300 connected to the multifunction peripheral 200A via the Internet 80. Here, HTTP request B1 includes a request transmission command requesting the transmission of data to the multifunction peripheral 200A. After transmitting HTTP request B1, the CPU 210 receives (S334B of FIG. 14) the specific data, that is, HTTP request E1 (see FIG. 13(H)) transmitted from the server 300 in response to (or as a response to) HTTP request B1. In a case where HTTP request E1 is received, the CPU 210 prohibits communications from external apparatuses to the specific port number PNweb (S338B of FIG. 14). As a result, when there is potential for the multifunction peripheral 200A to have security-related issues, such as when the network configuration is a non-recommended configuration described above, the multifunction peripheral 200A can recognize this potential for security-related issues when HTTP request E1 is received from the server 300 operating (or functioning) as a client after the multifunction peripheral 200A receives HTTP request A1 from an external apparatus. Hence, the multifunction peripheral 200A can properly execute a process for prohibiting communications from external apparatuses to the specific port number PNweb.

Further, in the third embodiment the multifunction peripheral 200A executes a process for prohibiting communications from external apparatuses to the specific port number PNweb in a case where the multifunction peripheral 200A receives HTTP request E1 within the wait time WT counted after the multifunction peripheral 200A transmits HTTP request B1. In a case where the multifunction peripheral 200A receives HTTP request E1 within the wait time WT, there is a very high probability that HTTP request E1 was transmitted over the Internet 80. Accordingly, there is a high probability that an external apparatus of the second type (the third party computer 400, for example) connected to the multifunction peripheral 200A via the Internet 80 can communicate with the multifunction peripheral 200A with the external apparatus of the second type functioning as a client and, thus, there is great potential for security-related issues. Accordingly, the multifunction peripheral 200A according to the third embodiment can properly execute a process for prohibiting communications from external apparatuses to the specific port number PNweb when there is great potential for security-related issues.

Further, in a case where the multifunction peripheral 200A of the third embodiment do not receive HTTP request E1 within the wait time WT, the multifunction peripheral 200A transmits (S336 of FIG. 11) HTTP response C1 to the source device of HTTP request A1 (the terminal device 10B, for example) as a response to HTTP request A1. In a case where the multifunction peripheral 200A does not receive HTTP request E1 within the wait time WT, there is a low probability that an external apparatus of the second type (the third party computer 400, for example) connected to the multifunction peripheral 200A via the Internet 80 can communicate with the multifunction peripheral 200A while the external apparatus functions as a client and, thus, there is low potential for security-related issues. As a result, the multifunction peripheral 200A can improve security by issuing HTTP response C1 after confirming a low potential for security-related issues.

Further, the multifunction peripheral 200A according to the third embodiment transmits (S316 of FIG. 14) HTTP request B1 to the server 300. As indicated by the designated port number in FIG. 13(B), HTTP request B1 includes number information designating specific port number PNweb for specifying a web server function that can be executed on the multifunction peripheral 200A. In S334B of FIG. 14, the multifunction peripheral 200A receives HTTP request E1 (see FIG. 13(H)) transmitted to the multifunction peripheral 200A with the specific port number PNweb specified as the destination port number. Since the specific port forwarding function is enabled under a non-recommended configuration, external apparatuses of the second type connected to the multifunction peripheral 200A over the Internet 80 can communicate with the multifunction peripheral 200A by specifying specific port number PNweb as the destination port number. According to the third embodiment, the multifunction peripheral 200A can properly execute a process for prohibiting communications from external apparatuses to the specific port number PNweb, which is triggered by reception of HTTP request E1.

If the HTTP request transmitted from the server 300 to the multifunction peripheral 200A were not to specify the specific port number PNweb as the destination port number, for example, the HTTP request would not reach the multifunction peripheral 200A even when the specific port forwarding function of the relay device 30C is enabled (under a non-recommended configuration). As a result, the multifunction peripheral 200A cannot recognize that a non-recommended configuration is set, even when a non-recommended configuration is set. However, the configuration of the embodiment can suppress such problems. Note that other cases of non-recommended configurations may assign a global IP address to the multifunction peripheral 200A without implementing the address modifying function, such as NAT or NAPT, on the relay device 30C. In such cases, an HTTP request, which includes the global IP address as the destination IP address and is transmitted from the server 300 to the multifunction peripheral 200A, will reach the multifunction peripheral 200A, even when the specific port number PNweb is not designated as the destination port number in the HTTP request. Hence, when such non-recommended configurations are set, the multifunction peripheral 200A can recognize that a non-recommended configuration has been made, even though specific port number PNweb is not designated as the destination port number in the HTTP request. According to the third embodiment, the multifunction peripheral 200A can properly recognize that a non-recommended configuration has been set, even when the non-recommended configuration enables the specific port forwarding function of the relay device 30C and even when the non-recommended configuration assigns a global IP address to the multifunction peripheral 200A.

According to the third embodiment described above, the specific port number PNweb is a destination port number designated in HTTP request A1 (see FIG. 13(A)). As a result, when external apparatuses of the second type can communicate with the multifunction peripheral 200A by specifying specific port number PNweb as the designated port number, the multifunction peripheral 200A can properly execute a process to prohibit communications from the external apparatus to the specific port number PNweb, triggered by reception of HTTP request A1 specifying specific port number PNweb as the destination port number. Thus, the multifunction peripheral 200A can appropriately prevent an external apparatus of the second type from using the settings management service specified by specific port number PNweb, for example.

According to the third embodiment described above, when the multifunction peripheral 200A receives HTTP request A1, the multifunction peripheral 200A determines whether the source device of HTTP request A1 is a device within the same network (S115 of FIG. 11, S314 of FIGS. 12 and 14, and S314C of FIG. 15). In a case where the source device of HTTP request A1 is a device within the same network (S115 of FIG. 11: YES, S314C of FIG. 15), the multifunction peripheral 200A transmits (S336C of FIG. 15) HTTP response C1 to the source device of HTTP request A1 (the terminal device 10A, for example). In this case, the multifunction peripheral 200A does not transmit HTTP request B1 to the server 300. When the source device of HTTP request A1 is a device outside the network (S115 of FIG. 11: NO, S314 of FIGS. 12 and 14), the multifunction peripheral 200A transmits HTTP request B1 to the server 300 (S316 of FIGS. 12 and 14). As a result, when the source device of HTTP request A1 is a device within the same network, the multifunction peripheral 200A can quickly transmit HTTP response C1 to the source device. Therefore, the multifunction peripheral 200A can rapidly provide the settings management service to devices in the same network (the terminal device 10A, for example).

As is clear from the above description, HTTP request A1 in FIG. 13(A) is an example of the second request, HTTP request B1 in FIG. 13(B) is an example of the request, the terminal device 10B and the third party computer 400 are examples of the first external apparatuses, and the server 300 is an example of the first external apparatus and the second external apparatus.

E. Fourth Embodiment

Figure 16:
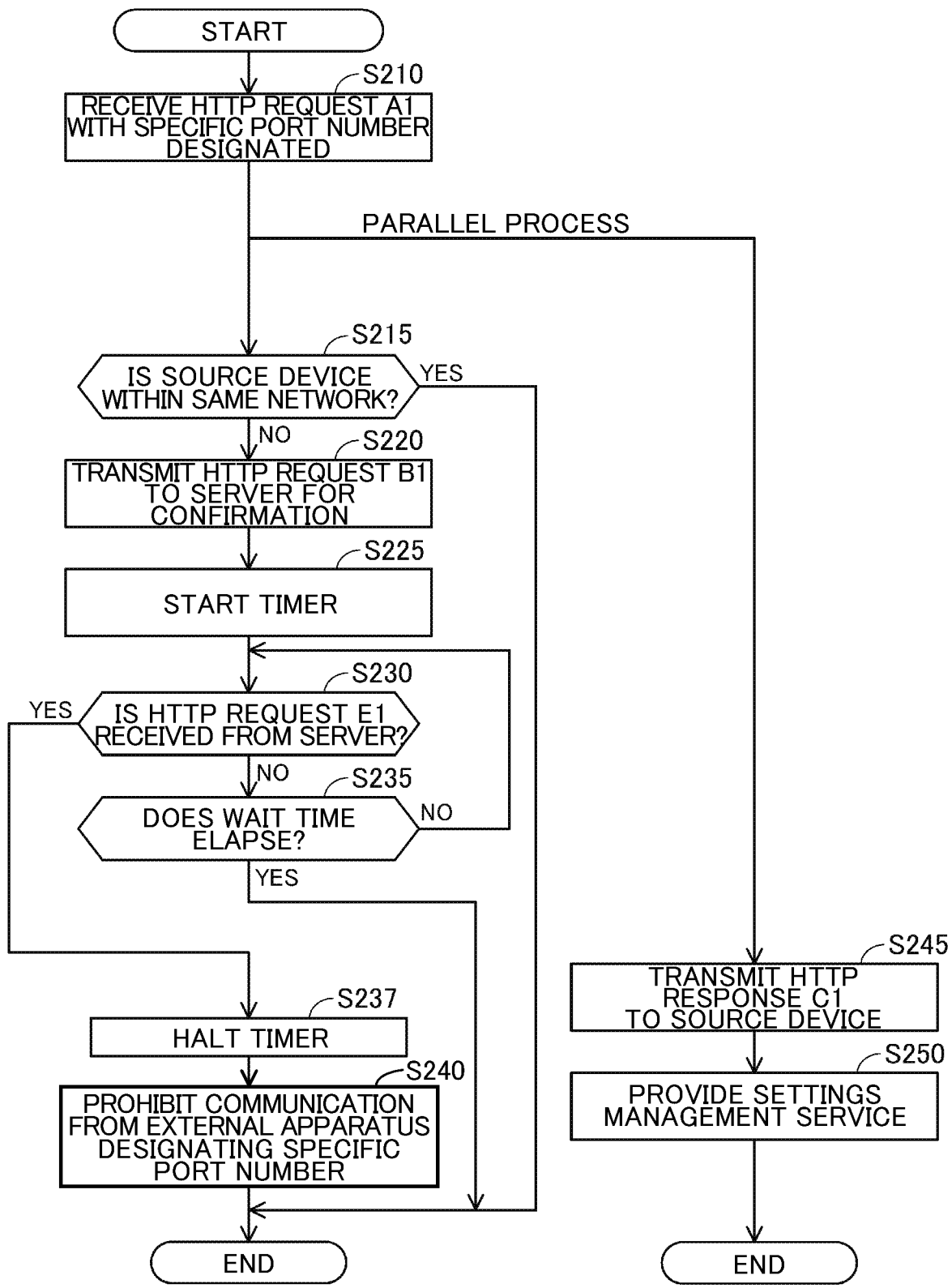
FIG. 16 is a flowchart showing steps in a settings confirmation process according to the fourth embodiment.

The configuration of system 2000 according to a fourth embodiment is the same as that shown in FIG. 9. A setting confirmation process according to the fourth embodiment is different from that of the third embodiment. FIG. 16 is a flowchart showing steps in a settings confirmation process according to a fourth embodiment. As with FIG. 11, the flowchart in FIG. 16 shows only the part of the settings confirmation process executed by the multifunction peripheral 200A. In a case where the CPU 210 of the multifunction peripheral 200A receives HTTP request A1 in S210 of the fourth embodiment, in S245 the CPU 210 transmits HTTP response C1 to the source device of HTTP request A1 and in S250 begins providing the settings management service. Accordingly, the CPU 210 begins providing the settings management service regardless of whether the source device of HTTP request A1 is an external apparatus or not.

In parallel to the processes of S245 and S250, in S215 the CPU 210 determines whether the source device of HTTP request A1 is a device within the same network, as in S115 of FIG. 11. In a case where the source device of HTTP request A1 is not a device within the same network (S215: NO), i.e., in a case where the source device of HTTP request A1 is an external apparatus, the CPU 210 advances to S220. However, in a case where the source device of HTTP request A1 is a device in the same network (S215: YES), the CPU 210 skips the process in steps S220-S240. When provision of the settings management service conducted in S250 in parallel to this process has not ended at this point, the CPU 210 continues providing this service.

Steps S220-S235 are identical to steps S120-S135 of FIG. 11. In a case where in S235 the prescribed wait time WT has elapsed from a timing of S225 without HTTP request E1 being received (S235: YES), the CPU 210 skips steps S237 and S240. When provision of the settings management service in S250 that is being conducted in parallel has not ended at this point, the CPU 210 continues providing this service.

In a case where HTTP request E1 is received in S230 (S230: YES), the CPU 210 halts the timer in S237 and prohibits communications from the external apparatus to the specific port number PNweb in S240, as in S137 and S140 of FIG. 11. In other words, provision of the settings management service is prohibited thereafter. When provision of the settings management service being conducted in parallel in S250 has not ended at this point, this provision is immediately interrupted.

In the fourth embodiment described above, the CPU 210 transmits HTTP response C1 as a response to HTTP request A1 in S245 to the source device of HTTP request A1, regardless of whether the multifunction peripheral 200A receives HTTP request E1 in S230. If the multifunction peripheral 200A receives HTTP request E1 after transmitting HTTP response C1 (S230: YES), in S240 the CPU 210 halts communications from the external apparatus to the specific port number PNweb. Thus, the CPU 210 can quickly transmit HTTP response C1 in response to (or as a response to) HTTP request A1 and, hence, can promptly provide the settings management service to an external apparatus of the first type (the terminal device 10B, for example) intended as a client for the settings management service. Since provision of this settings management service is interrupted if HTTP request E1 is received, the CPU 210 can suppress external apparatuses of the second type not intended to be clients for the settings management service from utilizing this service.

F. Variations of the Third and Fourth Embodiments (1) In the third and fourth embodiments described above, the first external apparatus that receives HTTP request C1 via the relay device 30C from the multifunction peripheral 200A and the second external apparatus that transmit HTTP request D1 are both the same device (the server 300), but the first and second external apparatuses may be different devices. For example, the first external apparatus may transmit the source IP address and the specific port number PNweb (designated port number) included in HTTP request C1 to the second external apparatus in a case where HTTP request C1 is received. In a case where the second external apparatus receives the source IP address and the specific port number PNweb (designated port number) from the first external apparatus, the second external apparatus may transmit HTTP request D1 over the Internet 80 by using the received information.

(2) In the third and fourth embodiments described above, specific port number PNweb is a port number specifying a web server (an application conforming to HTTP) that provides the settings management service. However, the specific port number PNweb may instead be a port number specifying another application that provides another service. For example, the specific port number may be a port number specifying an application conforming to the File Transfer Protocol (FTP) or an application conforming to the Internet Printing Protocol (IPP). In general, the specific port number is preferably a port number specifying an application that conforms to a protocol corresponding to the application layer of the OSI model.

(3) In S140 of FIG. 11 and in S240 of FIG. 14, the CPU 210 prohibits communications from an external apparatus to specific port number PNweb as a special security-related process. However, the CPU 210 may execute other processes instead of or in addition to this process as the special security-related process. For example, in a case where the CPU 210 receives an HTTP request addressed to the specific port number PNweb, the CPU 210 may execute a process for requesting authentication information, such as a password, and to enable an authorization function allowing communications with the specific port number PNweb thereafter, provided that proper authentication information is inputted. In addition, the CPU 210 may execute a process for displaying a warning screen on the display 240 that includes a message indicating that a non-recommended configuration is being employed, or a process for transmitting an e-mail including this message to the preregistered e-mail address of the user.

(4) HTTP request B1 transmitted from the multifunction peripheral 200A and HTTP request D1 transmitted from the server 300 in the third and fourth embodiments may conform to another protocol, such as FTP. Whatever protocol is used should be a protocol that allows the transmission of requests, with one of the multifunction peripheral 200A and server 300 serving as the client and the other as the server.

(5) HTTP request B1 transmitted by the multifunction peripheral 200A in the third and fourth embodiments may not include the specific port number as the destination port number (see FIG. 13(A)), while HTTP request D1 transmitted from the server 300 need not include a destination port number as the designated port number. In this case, the CPU 210 cannot recognize whether a non-recommended configuration is being used in a case where the non-recommended configuration is set so that the specific port forwarding function of the relay device 30C is enabled. However, the CPU 210 can suitably recognize whether a non-recommended configuration is being employed in a case where a global IP address to the multifunction peripheral 200A is assigned in the non-recommended configuration.

(6) In the third and fourth embodiments described above, the CPU 210 does not transmit HTTP request B1 to the server 300 in a case where the source device of HTTP request A1 is a device within the same network, but the CPU 210 may instead be configured to transmit HTTP request B1 to the server 300 regardless of whether the source device of HTTP request A1 is within the same network or not.

(7) In a case where HTTP request E1 is received after the wait time WT has elapsed following transmission of HTTP request B1 from the multifunction peripheral 200A, the CPU 210 may execute the special security-related processes in the fourth embodiment. In this case, steps related to the wait time WT may be omitted.

(8) While the multifunction peripheral 200A serves as the communication apparatus in the third and fourth embodiments described above, an image processing apparatus such as a standalone scanner, a printer, or a digital camera may be applied as a communication apparatus. Other types of communication apparatuses may be used in place of an image processing apparatus, such as storage device or personal computer.

G. Variations of All the Embodiments (1) In the above embodiments, the server 300 may be a cloud server including a plurality of apparatuses (for example, computers) which can communicate with each other via network.

(2) In the above embodiments, part of the configuration implemented in hardware in the embodiment described above may be replaced by software and, conversely, part of the configuration of the invention implemented in software may be replaced by hardware.

(3) In the above embodiments, when all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

The present specification contains the followings aspects. According to an aspect 1, A communication apparatus includes: a processor (210); and a memory (230) storing computer-readable instructions therein, the computer-readable instructions, when executed by the processor, causing the communication apparatus to perform: transmitting to a first external apparatus, which is connected to the communication apparatus via Internet, a request to request data transmission while the communication apparatus functions as a client and the first external apparatus functions as a server (S14, S44, S120, S220, S316); after transmitting the request, receiving specific data as a response to the request from a second external apparatus which is connected to the communication apparatus via the Internet while the second external apparatus functions as a client and the communication apparatus functions as a server (S60, S130, S230, S334B); and executing a specific process related to security after receiving the specific data (S68, S70, S137, S240, S228B). According to the aspect 1, the request is transmitted to the first external apparatus from the communication apparatus. In a case where the specific data is received from the first external apparatus functioning as a client, the specific process related to security is executed. As a result, if there is a potential for the communication apparatus to have security issues, the communication apparatus can properly executes the specific process related to security by receiving the specific data from the first external apparatus functioning as a client.

According to an aspect 2 depending from the aspect 1, the request includes a specific URL (Uniform Resource Locator). The receiving unit receives the specific data specifying the specific URL as destination.

According to an aspect 3 depending from aspect 1, the first external apparatus and the second external apparatus are the same apparatus.

According to an aspect 4 depending from aspect 1, the computer-readable instructions causes the communication apparatus to further perform receiving a second request from a third external apparatus while the third external apparatus functions as a client and the communication apparatus functions as a server. The request is transmitted after receiving the second request from the third external apparatus.

According to an aspect 5 depending from aspect 4, the first external apparatus and the second external apparatus are the same apparatus.

While the disclosure has been described in detail with reference to the above embodiments, it would be apparent to those skilled in the art that various changes and modifications may be made thereto.

What is claimed is:

1. A communication apparatus comprising:
    a processor; and
    a memory storing computer-readable instructions therein, the computer-readable instructions, when executed by the processor, causing the communication apparatus to perform:
        transmitting a first request including specific identification information and a request transmission command to a relay device so that the relay device relays the specific identification information and the request transmission command to a first external apparatus, which is connected to the communication apparatus via Internet while the communication apparatus functions as a client and the first external apparatus functions as a server, the request transmission command to request data transmission;
        after transmitting the first request, receiving a second request including the specific identification information from the relay device, the specific identification information included in the second request being obtained by the relay device from a request that is transmitted from a second external apparatus to the relay device according to the request transmission command included in the first request while the second external apparatus functions as a client and the communication apparatus functions as a server, the second external apparatus being connected to the communication apparatus via the Internet and the relay device; and
        executing a specific process related to security after receiving the second request including the specific identification information.

2. The communication apparatus according to claim 1, wherein the computer-readable instructions cause the communication apparatus to further perform detecting a transition from a first state where the communication apparatus is incapable of accessing to specific information to a second state where the communication apparatus is capable of accessing to the specific information, and
    wherein the first request is transmitted in response to detecting the transition.

3. The communication apparatus according to claim 2, further comprising an interface,
    wherein the specific information includes information stored in an external storage device connected to the interface without using the Internet, and
    wherein the transition includes a transition from a state, as the first state, where the external storage device is not connected to the interface to a state, as the second state, where the external storage device is brought to connection to the interface.

4. The communication apparatus according to claim 2, wherein the specific information includes a specific IP address used in a communication with external apparatuses via the Internet, and
    wherein the transition includes a transition from a state, as the first state, where the specific IP address is not assigned to the communication apparatus to a state, as the second state, where the specific IP address is assigned to the communication apparatus.

5. The communication apparatus according to claim 2, wherein the communication apparatus is capable of communicating with an external server via the Internet,
    wherein the specific information includes information stored in the external server, and
    wherein the transition includes a transition from a state, as the first state, where setting of the communication apparatus is a first setting in which a communication with the external server is not allowed to a state, as the second state, where setting of the communication apparatus is a second setting in which the communication with the external server is allowed.

6. The communication apparatus according to claim 2, further comprising a storage configured to store address information designating destination of data that the communication apparatus transmits,
    wherein the specific information includes specific address information, and
    wherein the transition includes a transition from a state, as the first state, where the specific address information is not stored in the storage to a state, as the second state, where the specific address information is stored in the storage.

7. The communication apparatus according to claim 2, further comprising:
an image processing machine configured to perform a specific image process; and
a storage configured to store setting information related to the specific image process,
wherein the specific information includes specific setting information related to the specific image process, and
wherein the transition includes a transition from a state, as the first state, where the specific setting information is not stored in the storage to a state, as the second state, where the specific setting information is stored in the storage.

8. The communication apparatus according to claim 2, wherein the specific process is executed in a case where the second request is received within a specific period of time, the specific period of time being set in relation to the transmission of the first request.

9. The communication apparatus according to claim 2, wherein the specific process includes a switching process to switch authentication function to an enabled state from a disabled state, and
wherein the authentication function allows a provision of specific service to another apparatus when specific authentication information is inputted from the another apparatus whereas the authentication function prohibits the provision of the specific service to the another apparatus when the specific authentication information is not inputted from the another apparatus.

10. The communication apparatus according to claim 2, wherein the communication apparatus is capable of:
performing a communication using HTTP (Hypertext Transfer Protocol); and
functioning as both a client and a server in conformance with HTTP,
wherein the transmitting the first request includes transmitting an HTTP request to the relay device so that the relay device relays the first request to the first external apparatus while the communication apparatus functions as a client in conformance with HTTP and the first external apparatus functions as a server in conformance with HTTP, and
wherein the receiving the second request includes receiving an HTTP request from the relay device, the specific identification information included in the second request being obtained by the relay device from the request that is transmitted from the second external apparatus while the communication apparatus functions as a server in conformance with HTTP and the second external apparatus functions as a client in conformance with HTTP.

11. The communication apparatus according to claim 1, wherein the first request is transmitted in response to power being turned on to the communication apparatus.

12. The communication apparatus according to claim 1, wherein the computer-readable instructions cause the communication apparatus to further perform receiving a third request from the relay device, the third request being obtained from a request received by the relay device from a third external apparatus while the third external apparatus functions as a client and the communication apparatus functions as a server, and
wherein the first request is transmitted after receiving the third request from the relay device.

13. The communication apparatus according to claim 12, wherein the specific process is executed in a case where the second request is received within a specific period of time, the specific period of time being set in relation to the transmission of the first request.

14. The communication apparatus according to claim 13, wherein the computer-readable instructions cause the communication apparatus to further perform transmitting a response to the third request to the relay device such that the relay device relays the third request to the third external apparatus when the second request is not received.

15. The communication apparatus according to claim 12, wherein the computer-readable instructions cause the communication apparatus to further perform transmitting a response to the third request to the relay device such that the relay device relays the third request to the third external apparatus irrespective of whether the second request is received or not, and
wherein the specific process is performed in a case where the second request is received after the response is transmitted.

16. The communication apparatus according to claim 12, wherein the transmitted first request includes number information specifying a specific port number indicating a specific application that the communication apparatus is capable of executing, and
wherein the received second request is transmitted with designation of the specific port number as a destination port number.

17. The communication apparatus according to claim 16, wherein the specific port number is the destination port number designated in the third request.

18. The communication apparatus according to claim 16, wherein the specific process sets a state of the communication apparatus so that the third external apparatus is incapable of using a port corresponding to the specific port number.

19. The communication apparatus according to claim 12, wherein the third external apparatus communicates with the communication apparatus via a specific gateway,
wherein the computer-readable instructions cause the communication apparatus to further perform determining whether the third request is received via the specific gateway or without using the specific gateway in a case where the third request is received; and
transmitting a response to the third request to a transmission source of the third request in a case where the third request is received without using the specific gateway, and
wherein the first request is transmitted in a case where the third request is received via the specific gateway whereas the first request is not transmitted in a case where the third request is received without using the specific gateway.

* * * * *